(12) United States Patent
Farley et al.

(10) Patent No.: US 7,570,672 B2
(45) Date of Patent: Aug. 4, 2009

(54) FIBER OPTIC MULTIPLEX MODEM

(75) Inventors: Joseph D. Farley, Warwick, MA (US);
Gary W. Vincent, Lunenburg, MA (US);
Brian A. Rusiecki, Sterling, MA (US);
Kenneth E. Savage, Jr., Fitchburg, MA (US)

(73) Assignee: SimplexGrinnell LP, Westminster, MA (US)

( * ) Notice: Subject to any disclaimer, the term of this patent is extended or adjusted under 35 U.S.C. 154(b) by 1001 days.

(21) Appl. No.: 10/770,249

(22) Filed: Feb. 2, 2004

(65) Prior Publication Data

US 2005/0169321 A1    Aug. 4, 2005

(51) Int. Cl.
*H04J 3/04* (2006.01)
(52) U.S. Cl. .................. 370/535; 370/401
(58) Field of Classification Search .......... 370/386, 370/389, 391, 400, 401, 402, 404, 406, 419, 370/487, 493, 535, 537, 539, 359, 395.5, 370/395.51, 420, 463, 542, 543, 352–358, 370/405, 424, 460, 532, 534, 541
See application file for complete search history.

(56) References Cited

U.S. PATENT DOCUMENTS

| | | | | |
|---|---|---|---|---|
| 5,245,667 A | * | 9/1993 | Lew | 381/94.4 |
| 6,307,839 B1 | * | 10/2001 | Gerszberg et al. | 370/235 |
| 6,356,369 B1 | * | 3/2002 | Farhan | 398/72 |
| 6,751,239 B2 | * | 6/2004 | Raman et al. | 370/466 |
| 6,862,380 B2 | * | 3/2005 | Chaudhuri et al. | 385/17 |
| 7,110,424 B2 | * | 9/2006 | Barnes et al. | 370/539 |
| 7,224,998 B2 | * | 5/2007 | Crocker et al. | 455/557 |
| 7,352,966 B2 | * | 4/2008 | Chaudhuri et al. | 398/5 |
| 2004/0022545 A1 | * | 2/2004 | Chiu | 398/141 |

OTHER PUBLICATIONS

International Fiber Systems, Incorporated, Product Specification for 8-Channel Full-Duplex Data Multiplexer D8000 Series.

* cited by examiner

Primary Examiner—Brenda Pham

(57) ABSTRACT

A fire alarm network fiber optic multiplex modem includes plural local interfaces, a fiber optic interface, a multiplexor, a fiber optic modem, and a demultiplexor. The multiplexor combines data received at the local interfaces into an outgoing data stream. The fiber optic modem transmits, at a first wavelength, the outgoing data stream to the fiber optic interface and receives, at a second wavelength, an incoming data stream via the fiber optic interface. The demultiplexor separates the incoming data stream into separate data streams, and forwards each of the separate data streams to its corresponding local interface.

15 Claims, 35 Drawing Sheets

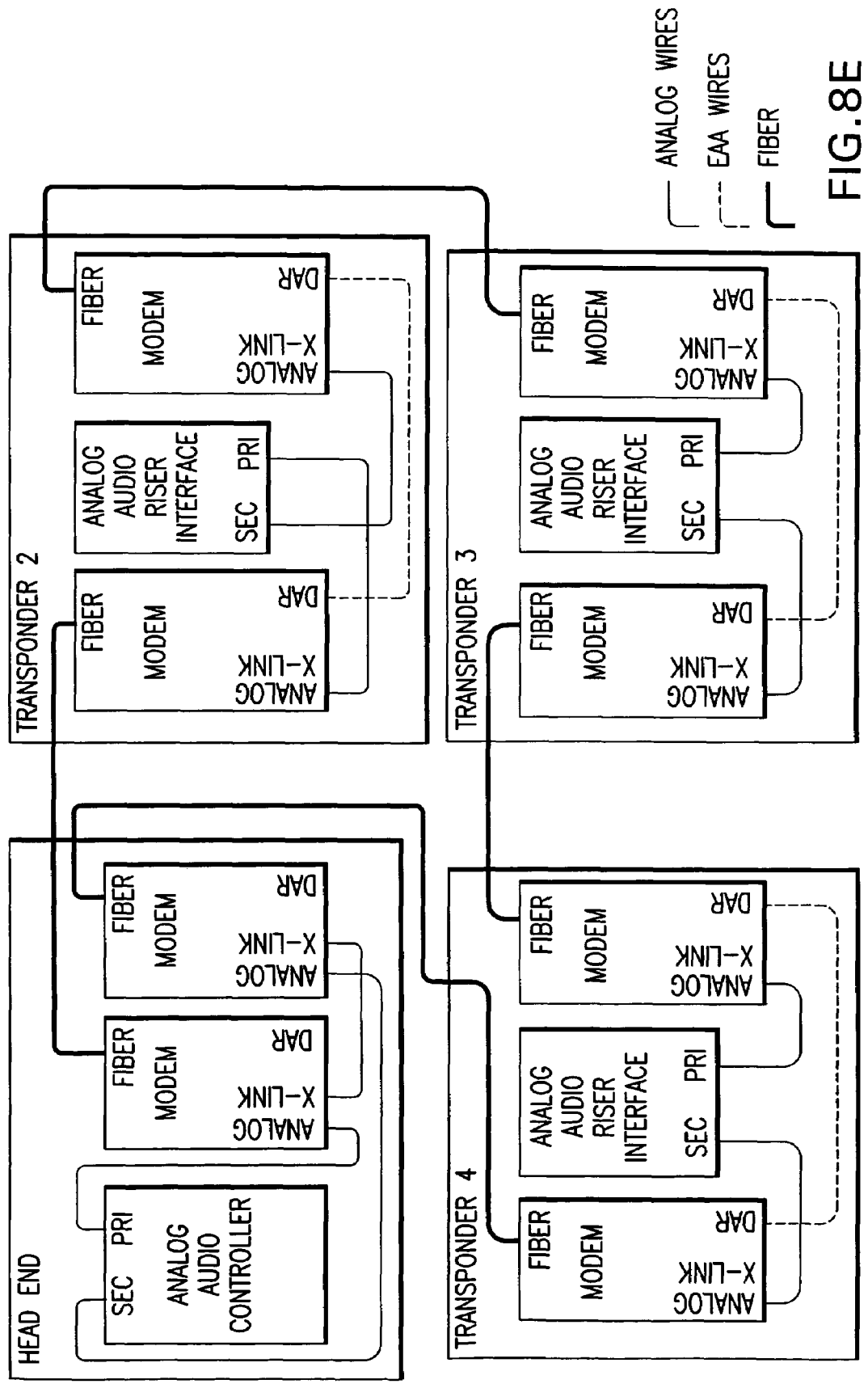

FIBER OPTIC MULTIPLEX MODEM

BACKGROUND OF THE INVENTION

In a typical fire alarm application, copper wires or multiple optical fibers may be used to convey data. Where fiber is used, one fiber is required for each data channel and for each direction; thus a two-way, two-channel system requires at least four fibers. In addition, typical fire alarm applications also provide for the generation and routing of one or more analog or digital audio signals, requiring even more wires or fibers.

SUMMARY OF THE INVENTION

It would be desirable to have multiple channels of data consisting of different data types and bandwidth requirements convey over a single fiber optic cable in both directions, using a minimal number of wavelength channels.

An embodiment of the present invention multiplexes signals in the time-domain, combining several asynchronous data streams, e.g., network communications and digitized analog audio, into a single data stream. Two wavelengths are utilized; one for each direction, so that the system can run full-duplex without regard to the traffic in the opposite direction.

A fire alarm network fiber optic multiplex modem, according to an embodiment of the present invention, includes one or more local interfaces, a fiber optic interface, a multiplexor, a fiber optic modem, and a demultiplexor. The multiplexor combines data received at the local interfaces into an outgoing data stream. The fiber optic modem transmits, at a first wavelength, the outgoing data stream to the fiber optic interface and receives, at a second wavelength, an incoming data stream via the fiber optic interface. The demultiplexor separates the incoming data stream into separate data streams, and forwards each of the separate data streams to its corresponding local interface. A mating modem, at the other end of the fiber optic channel, receives at the first wavelength and transmits at the second wavelength.

The local interfaces may, in various embodiments, be various combinations of, but are not limited to: a network interface, a remote unit interface, a digital audio interface, and an analog audio interface.

Where a digital audio interface is employed, in at least one embodiment it is not synchronized with the fiber optic multiplex modem. In such a case, the received digital audio signal may be sampled at plural intervals within a frame cycle, and a digital audio value placed in the outgoing data stream based on the samples. The digital audio value may correspond with the first sample taken during the frame cycle. A second value can be placed in the outgoing data stream to indicate in which of the plural samples the received digital audio signal changed values. In this manner, the many samples (say, sixty-four samples) can be compressed to eight bits. Furthermore, a third value may be placed in the outgoing data stream to indicate whether there has been a change in the received digital audio signal.

An embodiment of the present invention also includes a fault detector which, upon detection of a fault in a communications path, signals an indication of the fault to a second fiber optic multiplex modem via the fiber optic interface.

In Class A operation, a cross-link to a second fiber optic multiplex modem normally completes an electrical path in a communications loop. Upon detection a fault in a communications path that extends from the fiber optic interface, the cross-link is disconnected, creating an open-circuit in the electrical path. Alternatively, if the fault is a short circuit, a short circuit could be simulated in the electrical path.

A fault in the network may be detected by, for example, another modem, and the fault information may be transmitted to the present modem via information embedded in an incoming data stream received over an optical fiber directly or indirectly from that fiber optic multiplex modem which has detected the fault.

A fault may also be detected responsive to a failure to receive a valid incoming data stream via said communications path, or by a failure to detect electrical continuity, for example, in one of the local interfaces.

An embodiment with analog interface includes an analog-to-digital converter (ADC) that converts an outgoing analog signal received at the analog interface to a digital value. The digital value is then multiplexed onto the outgoing data stream. The modem can also include a digital-to-analog converter (DAC) that converts a digital value demultiplexed from the incoming data stream to an analog signal at the analog interface. One embodiment includes both an analog interface and a digital audio interface. Digitized analog audio received over the fiber channel is converted to analog and transmitted through an analog audio riser, while in parallel, the digitized analog audio is forwarded over the digital audio interface directly to a matching modem, thus avoiding signal loss due to excessive conversions between the digital and analog domain. This technique, called enhanced analog audio, may be used for other analog signals as well.

According to another embodiment of the present invention, a method for communicating between nodes in a fire alarm network includes: multiplexing data received from plural local interfaces into an outgoing data stream; transmitting, at a first wavelength, the outgoing data stream to a fiber optic interface; receiving, at a second wavelength, an incoming data stream via the fiber optic interface; demultiplexing the incoming data stream into separate data streams; and forwarding each of the separate data streams to a corresponding local interface.

Alternatively, a fire alarm network fiber optic multiplex modem, according to an embodiment of the present invention, comprises plural local interfaces including at least one of, but not limited to, a peer-to-peer protocol control panel communications interface; a master-to-slave protocol control panel/transponder communications interface; a digital audio interface; an analog audio interface; and a fire fighter phone interface. A combiner/decombiner combines data received at the local interfaces into an outgoing optical combined signal, separates an incoming optical combined signal into its constituent data streams, and forwards each of the separate data streams to a corresponding local interface. The outgoing optical combined signal is transmitted, and the incoming optical combined signal is received, over a single optical fiber through a fiber optic interface.

In one embodiment, the outgoing optical combined signal comprises a multiplexed outgoing data stream at a first wavelength, and the incoming optical combined signal comprises a multiplexed incoming data stream at a second wavelength. The outgoing and incoming data streams each have a defined fiber frame format.

In another embodiment, the outgoing optical combined signal comprises plural outgoing optical streams and the incoming optical combined signal comprises plural incoming streams. Each incoming and outgoing optical stream comprises data corresponding to a subset (i.e., one or more) of local inputs. Each optical stream is assigned to a unique wavelength.

In yet another embodiment, the outgoing optical combined signal comprises a multiplexed outgoing data stream at an assigned wavelength, and the incoming optical combined signal comprises a multiplexed incoming data stream at the same assigned wavelength, such that at any instant at most only one of the incoming and outgoing optical combined signals is transmitted over the optical fiber. The outgoing and incoming data streams each have a defined fiber frame format.

Embodiments of the present invention can work with either or both of single-mode or multimode fiber optic cable.

Class A operation may include, but is not limited to, style 6 and style 7 wiring as defined by the National Fire Protection Association (NFPA). Class B operation may include, but is not limited to, style 4 wiring as defined by the NFPA.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 8E is a schematic diagram illustrating the use of the enhanced analog audio (EAA) feature within the system of FIG. 8A.

DETAILED DESCRIPTION OF THE PREFERRED EMBODIMENTS

Fiber Optic Modem and Media Interface Overview

Figure 1:
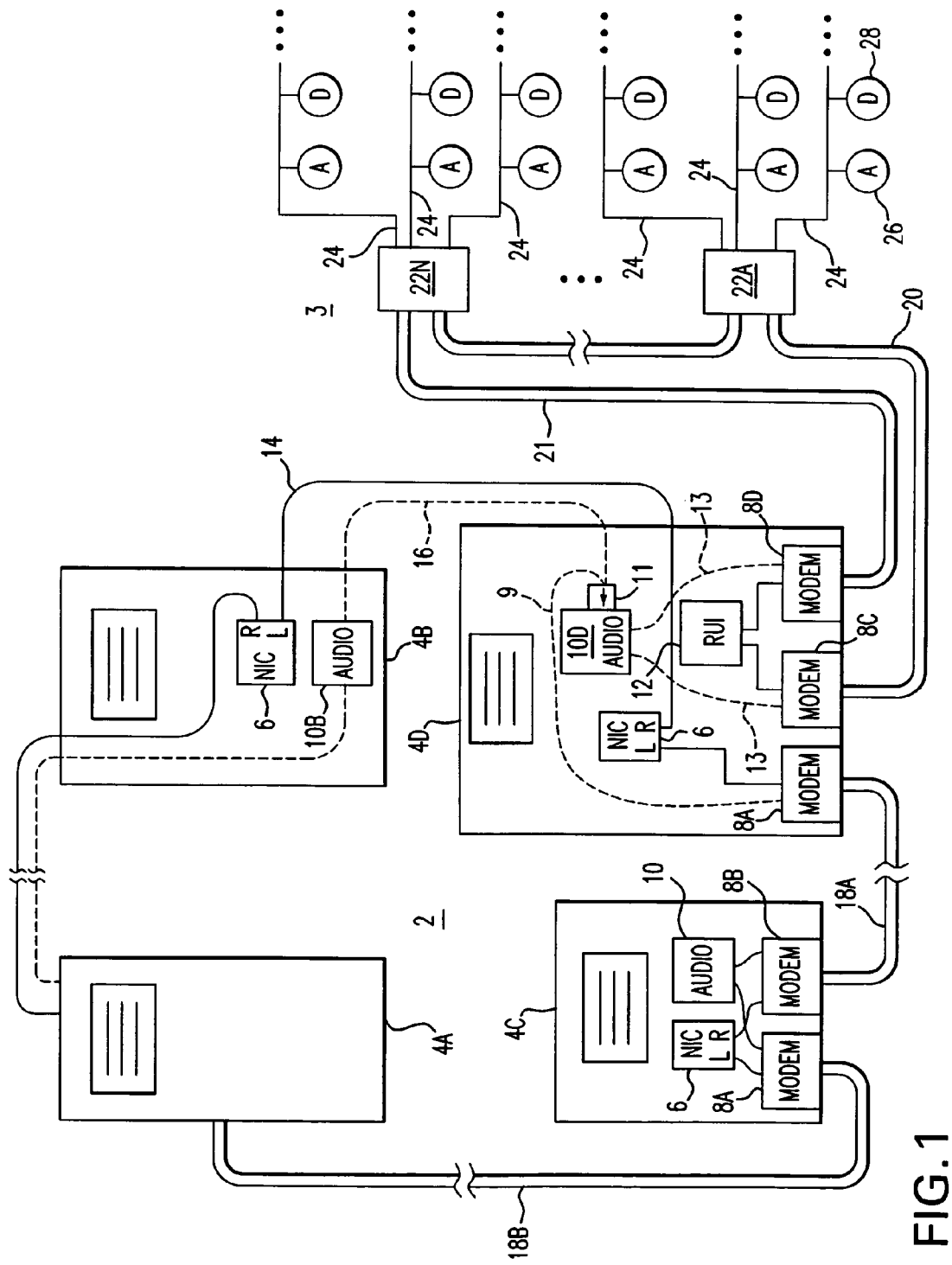
FIG. 1 is a schematic diagram showing, for exemplary purposes, an illustrative fire alarm network employing an embodiment of the present invention.

FIG. 1 is a schematic diagram showing, for exemplary purposes, an illustrative fire alarm network employing an embodiment of the present invention. This particular example shows four alarm control panels 4 connected in a "master/ master" ring network 2 arrangement, wherein the control panels exchange "network communications" data.

As might be found in systems prior to implementation of the present invention, some of the master-to-master connections are implemented with a network cable 14, such as a bi-directional differential wire-pair according to a standard such as RS-485. Alternatively, pairs of fiber optic cables have been employed, one for each direction.

In addition, digital or analog audio may be generated by an audio controller 10 and circulated throughout all or a portion of the system. Some systems, for example, might provide one or more analog audio signals each on its own two-wire pair 16. Other systems might provide plural digital audio signals on one pair of wires, using time-division multiplexing techniques.

As shown in this example, for network communications, fire alarm control panel 4B uses a network interface card (NIC) 6 that has a left (L) and a right (R) channel. The R channel connected to alarm control panel 4A, and the L channel connected to alarm control panel 4D. (Note that a "card," as used here and elsewhere throughout this specification, signifies a functional module that may be a separate installable printed circuit card, or alternatively, a circuit either embedded in a printed circuit card or some other module.) Of course, data intended for alarm control panel 4B is forwarded internally to a controller (not shown) with the panel 4B.

An audio controller 10 generates and transmits audio content over the audio cable 16 to other control panels within the network 2, each of which has either its own audio controller, an analog "riser interface card" (RIC), or a "digital audio riser interface card" (DARIC). In existing systems, both RICs and DARICs recover an audio signal and provide that signal locally. A RIC simply passes on the analog signal to the next control panel, while a DARIC regenerates the signal.

Fire alarm control panel 4D similarly has a NIC 6 and audio interface 10. The audio signal is also routed, through fire alarm control panel 4D's audio controller 10 Here, however, the network and audio signals are brought to local interfaces of fiber optic multiplex modem 8A, which transmits and receives both network data and audio (analog or digital) signals to fire alarm control panel 4C over a single fiber optic cable 18A. Note that the audio signal received from control panel 4B on wire 16 is received by an audio input option card 11 and routed directly to the network fiber optic multiplex modem 8A via wire 9.

Fire alarm control panel 4C has a similar arrangement, but has two fiber optic multiplex modems, the first 8A to communicate with fire alarm control panel 4A over a fiber optic cable 18B and the second 8B to communicate with fire alarm control panel 4D over fiber optic cable 18A. Modems 8A and 8B are preferably identical except that the first 8A transmits over a first wavelength and receives over a second wavelength, while the second modem 8B receives over the first wavelength and transmits over the second wavelength.

The details of fire alarm control panel 4A are not shown but would be comprise elements similar to those of fire alarm control panel 4D discussed above.

In addition to the network interfaces, each fire alarm control panel may control one or more slave networks 3 having one or more transponders 22. Thus, a fire alarm control panel may have one or more remote unit interfaces (RUIs) 12, for connecting to transponder units 22 using a master/slave protocol. Transponders 22 are typically located throughout a building and control and monitor notification appliances 26 such as horns and strobes, and detection devices 28 such as fire and smoke detectors, using a protocol such as Simplex Time Recorder Co.'s MAPNET II®, IDNET or TrueAlarm®.

Although two transponders 22 are shown, it would be understood by one skilled in the art that each fire alarm control panel 4 may have one or more RUIs, and that each RUI 12 may interface with one, two or more transponders 22. A fire alarm control panel 4 may also monitor and control notification appliances and detection devices directly (not shown).

According to the prior art, the RUI would connect directly the transponders 22 through a RUI network comprising wire or fiber optic cables for each direction (not shown). In addition, audio would be routed on its own cable or fiber to the transponders 22.

Using an embodiment of the present invention, one or more of the multi-cable connections between the fire alarm control panel 4D and transponder 22A, or between transponders 22, are replaced with a single full duplex fiber optic cable. In the example of FIG. 1, all such connections have been replaced with fiber optic cable. In fire alarm control panel 4D, this requires the addition of at least one fiber optic multiplex modem 8C and a mating fiber optic multiplex modem (not shown) in transponder 22A, connected by fiber optic cable 20 which has replaced RUI and audio riser cables. The audio signal captured by the audio input option card 11, or generated by the audio controller 10D, is routed to the fiber optic multiplex modems 8C, 8D via links 13. (The second modem 8D is required for Class A operation, discussed below.)

In "Class B" operation, the RUI network would terminate at the last transponder 22N in the chain. In "Class A" operation, however, the loop is completed by the addition of a return link 21 from the last transponder 22N back to the fire alarm control panel 4D, via fiber optic multiplex modem 8D within the fire alarm control panel 4D.

The fiber optic multiplex modem of an embodiment of the present invention thus converts system audio and communication copper wiring (or multiple simplex fiber optic cables) to a single full duplex fiber optic link. In at least one embodiment, the modem is a "pass through" element, and is not addressable. In one design, the fiber optic multiplex modem 8 comprises a modem card and a fiber optic media card. The modem card contains conversion circuitry, an interface for the fiber optic media card, and the various wired media circuitry. The fiber optic media card contains the fiber optic components and is assembled as either a "left port" or a "right port". These two different assemblies are required because the media card uses two wavelengths to pass full duplex data over a single fiber. For example, the left port may utilize a 1310 nm transmitter and a 1550 nm receiver while the right port utilizes a 1310 nm receiver and a 1550 nm transmitter. The fiber optic media card plugs into the modem assembly to create a left port or a right port assembly. The fiber optic multiplex modem is designed to mount both internally within a host equipment box (such as a fire alarm control panel) or in a separate box. The host equipment may provide power.

Fiber Optic Modem and Media Interfaces

In one embodiment, the fiber optic modem card contains the required circuitry to multiplex and demultiplex the wired media data into a single data stream for passage through a fiber optic link. A left port media assembly on one modem communicates with a right port media assembly over the fiber link. The fiber media cards use two wavelengths to allow full duplex bi-directional communications on a single fiber.

The fiber optic multiplex modem has several local interfaces, including but not limited to: a network media interface, a remote unit interface (RUI) media interface, a digital audio riser (DAR) media interface, and an analog audio media interface. In some embodiments, certain combinations of interfaces may not be permitted or used.

Figure 2:
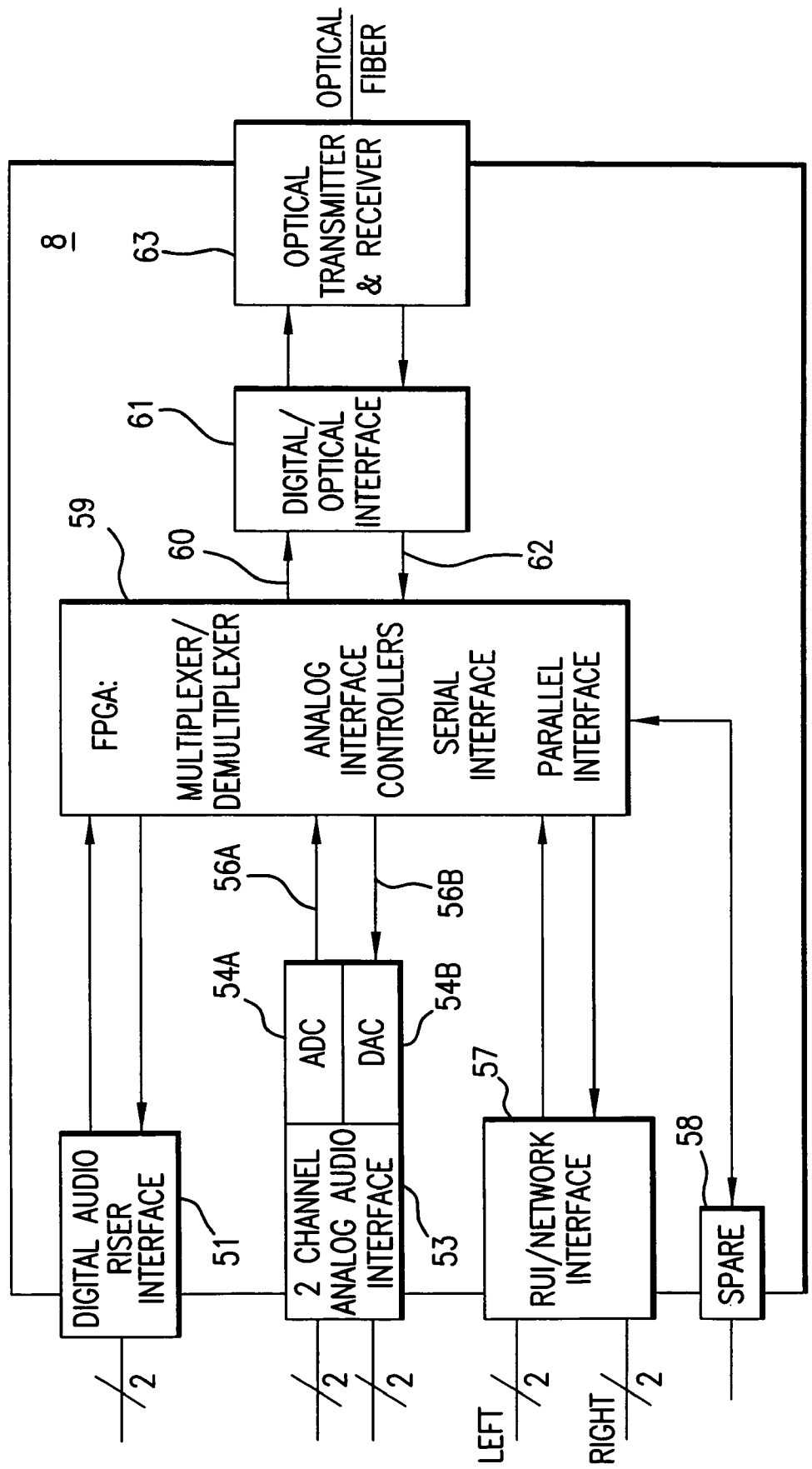
FIG. 2 is a block diagram of an embodiment of the present invention fiber optic multiplex modem.

FIG. 2 is a block diagram of an embodiment of the present invention fiber optic multiplex modem 8, having six logical channels. A general description of each logical channel is listed in Table 1. Spare inputs 58 may be available in the modem. In the described embodiment, the spare channel corresponds with bit 14 of the fiber frame (FIG. 3), which is discussed below.

TABLE 1

Modem logical channels

| Channel | Availability |
| --- | --- |
| DAR | always available |
| Analog 1 | always available |
| Analog 2 | always available |
| RUI or Network left port | always available for either RUI or Network left port |
| Network right port | always available |
| Spare | always available |

The fiber optic multiplex modem described herein includes, in at least one embodiment, a media converter card that accepts a group of inputs, converts them to digital as required, and multiplexes them onto a single optical fiber. The media converter card also receives an incoming optical data stream, converts it back to an electrical signal, and demultiplexes it back into its respective components. The modem has unique discrete (local) interfaces that connect to various I/O sources. The presence and operation of the modem are generally transparent to the connected equipment and system. All supervision and fault detection of the connected wires are the responsibility of the connected equipment, although the modem does monitor wires to convey faults back to the connected equipment.

A field programmable gate array (FPGA) 59, such as a Xilinx, Inc. Spartan-II series FPGA, provides various functions, including multiplexing and demultiplexing functions and interface control. Such control could also be implemented by a processor or other control circuitry. The FPGA transmits the output stream 60 to and receives the input stream 62 from an optical transmitter and receiver 63 via the digital/optical interface 61.

From the perspective of the internal logic of the FPGA 59, the fiber interface appears as two separate paths: transmit and receive. The integration (and differentiation) of the two signals is the responsibility of other components.

Digital Audio Riser (DAR) Interface 51

The digital audio riser (DAR) media interface 51 can be wired for Class A or Class B DAR communications and contains circuitry that interfaces to a DAR interface card located in a control panel or transponder. In one embodiment, the DAR channel can be used for any signal of equal or lesser speed than the DAR (768 kbaud). Preferably, direction control circuit currently searches for receipt of a framing word within 125 us periods. If no frame sync occurs within 2 s, the direction control switches directions. However, if this channel were used for other protocols, a different direction control may be used.

Analog Audio Media Interface 53

The analog audio media interface 53 can provide two channels (or more in alternative embodiments) that can be configured for Class A or B operation, and contains circuitry to emulate an analog audio controller's output and supervision circuit, as well as an analog audio riser interface card.

In the illustrative embodiment, two analog channels are brought into the FPGA 59 via a single interface 56. An analog to digital converter (ADC) 54A, such as a Burr-Brown (TI) PCM1801, 16-bit delta sigma dual converter, digitizes and serializes two channels into one digital stream 56A. At the card level, the analog inputs are two separate electrical interfaces. In the other direction, a digital to analog converter (DAC) 54B, such as a Burr-Brown (TI) PCM1725, 16-bit dual channel converter, converts a digital stream 56B into two analog channels. The analog channels can be used for any signal for which 32 ksps are sufficient, bearing in mind that Mu Law compression is performed on the analog data. The direction control methodology (DC supervision) must be taken into consideration if these inputs are assigned to some other input type.

Network/Remote Unit Interface (RUI) 57

The network media interface may be, for example, a "pass through" RS485 interface that allows the fiber optic multiplex modem to sit between network interface cards (NICs) 6 in the host panels 4 (FIG. 1). Communications control is handled by the NICs. Fiber optic multiplex modems can be configured to provide, but are not limited to, ring, hub and star topologies in network systems.

The RUI media interface 12 can be configured for Class A or B communications and may contain circuitry that emulates an RUI card or a transponder interface card's (TIC) RUI circuitry.

These inputs may be re-assigned to an input for which 768 ksps is sufficient. This could require that the FPGA direction control timing circuits change to accommodate speeds other the 9600 and 57.6 k. For other input types, the direction control circuits would need to be taken into consideration.

Figure 3:
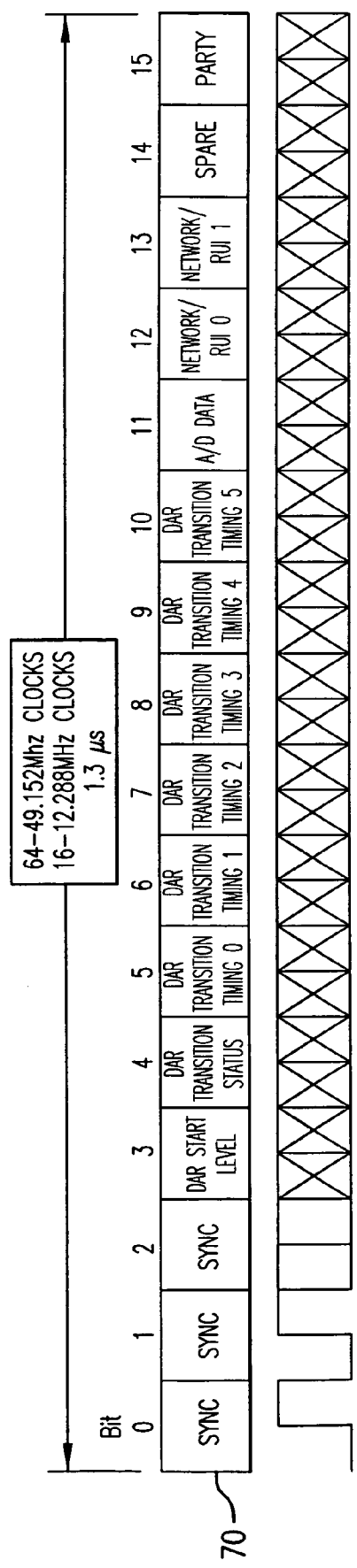
FIG. 3 is a timing diagram illustrating the construction of the fiber frame of an embodiment of the present invention.

Fiber Frame 70 (FIG. 3)

The FPGA 59 (FIG. 2) operates asynchronously with respect to all inputs except the converted analog inputs. Due to this asynchronous nature, compression and regeneration imposes some jitter on the signals. In one embodiment, the FPGA operates at 49.152 MHz, which is four times the maximum frequency of any input component. The FPGA 59 may internally multiply the clock by two to minimize the timing error in detecting the fiber frame. Operating at this frequency and constructing a fiber frame as shown in FIG. 3, described below, assures that the jitter is within acceptable limits.

FIG. 3 shows the construction of the fiber frame 70 of at least one embodiment of the present invention. The frame is 16 bits in length, and its total duration (1.3 us) is approximately equal to the duration of one digital audio riser bit. The fiber data may be encoded using, for example, inverted Manchester encoding, in which each bit has a transition in the center, the first half of the bit time containing the actual data level for that bit. The frequency of the signal on the fiber is 24.576 MHz. The details of each portion of the frame are now described.

Synchronization

A synchronization "word" preferably comprises the first three bits of the frame. These bits are dedicated to maintaining frame synchronization between transmitting and receiving modems. Alternatively, the synchronization word could be reduced to one bit because there is no data within the fiber frame that would ever transition every single fiber frame indefinitely. However, the 3-bit synchronization word is beneficial because the two low-bit requirement preceding the toggle bit accelerates the initial frame synchronization detection time.

The synchronization method, termed LLX (low-low-x) or LL-Toggle (low-low-toggle) consists of two consecutive low bits (which actually are low-to-high transitions considering both halves of each bit) followed by a "toggle" or "x" bit. The toggle bit changes state in every consecutive fiber frame. The toggle bit is the critical portion of the framing word, since no other bit within the data frame (based on data content) can toggle in every consecutive frame. A synchronization detection circuit within the receiving modem searches for this pattern, and then remembers the previous toggle-bit value once the pattern is detected. If the pattern ever fails to be repeated in consecutive frames, then the circuit resumes searching. It is possible that the initial synchronization word detection could have happened somewhere in the data portion of the frame. Should this occur, the recurrence of the framing word at the expected time eventually fails (within about 10 frames worst case). The search then continues until the pattern is found again.

Digital Audio Riser (DAR)

The DAR word comprises bits 3-10 of the fiber frame 70. The DAR operates at 768 kHz, or 1.3 us per bit. Due to the fact that the DAR operates asynchronously with respect to the local clock, it is not sufficient to transmit only one bit of DAR data per 1.3 us frame. Since the jitter allowed on the DAR to maintain DAR interface card (DARIC) synchronization is less than 81 ns (in addition to the jitter already imposed by a preceding DARIC, if present), then the fiber frame 70 must effectively transmit all data received during the sixty-four 49.152 MHz clock cycles of a frame 70.

Jitter may occur due to various factors, including 1) error resulting from crystal drift; 2) error resulting from correction in a regenerated DAR; 3) error added by one 49.152 MHz asynchronous sampling; 4) error added by a second 49.152 MHz asynchronous sampling; and 5) a limit to the amount of error that can be detected and corrected. There can thus be one-half of a 12.288 MHz clock cycle, or 40 ns margin between the worst-case error stack up and loss-of-sync.

In order to effectively transmit all 64 samples, some compression must be done to the data (to allow time for all other signals to be transmitted during a frame). The 64 samples of data can effectively be transmitted in the eight allocated bits as follows:

DAR start level bit: The actual logic level present on the first sample.

DAR transition status: Indicates whether or not a logic transition occurred during the frame. For example, high=transition occurred; low=no transition occurred.

DAR transition timing 0-5: Six-bit binary representation of when the transition occurred (decimal 0-63).

Alternatively, six-bit compression may be accomplished by generating a local DAR bit timing clock, and using the four bits of transition timing to transmit a correction to that timing. Four bits can provide a correction of plus or minus (signed) eight decimal clocks. This is three more than is required: four clock cycles of variation are possible resulting from a DARIC correction, and an additional clock cycle may occur from clock divergence.

Notwithstanding the above discussion, eight-bit compression is currently preferred in part because the bandwidth is available, and because the hardware implementation is considerably simpler.

Encoded Analog Channels

Bit 11 of the fiber frame 70 contains data from the analog to digital converter 54A (FIG. 2). Since the analog to digital conversion is synchronous with the local clock, a single bit is allocated for this purpose.

Figure 4:
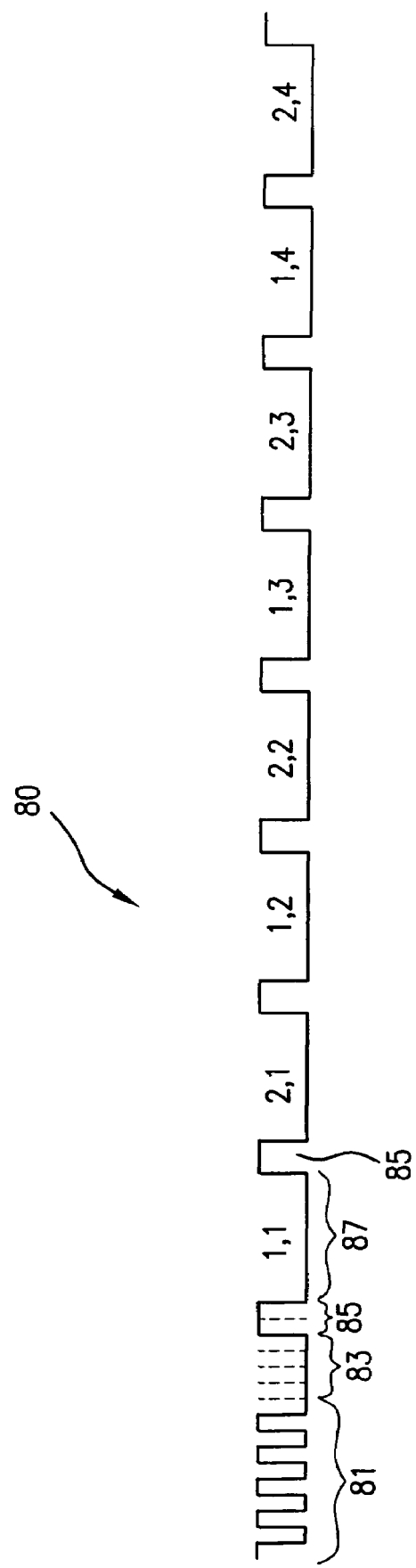
FIG. 4 is a schematic diagram illustrating an analog data frame constructed by an embodiment of the present invention.

FIG. 4 shows the channel distribution format within the encoded analog data frame (ADF) 80, which is distributed over many fiber frames 70 (in bit 11 of the fiber frame—see FIG. 3). Because the fiber frame 70 and the ADF 80 are not necessarily synchronized (with respect to frame synchronization), the ADF 80 begins with a framing word 81 having a pattern (in this example, alternating 1s and 0s) that is guaranteed not to appear within the remainder of the ADF. The framing word 81 is followed, in this example, by four bits comprising control/status data 83, described in Tables 2 and 3 below. The control/status data 83 are followed by a "guard" 85 that comprises two high bits. The two-channel digitized analog audio information then follows.

In FIG. 4, the first number of each slot 87 indicates the analog channel, and the second indicates which byte of data is contained in this segment, e.g., "2,3" represents channel 2, byte 3. The data may be Mu-Law encoded 16-bit. Each slot 87 is separated by a two-bit guard 85.

Of course, one skilled in the art would recognize that framing word and guard patterns as well as the number of bits in any of the framing word, control/status word, guards or analog channel slots, or the number of analog channels, are simply a matter of implementation and could vary within the scope of the invention.

Network Communication/Remote Unit Interface (RUI)

The network interface may be, for example, an RS485 interface, that acts as a "pass through" device allowing direction control and data processing to be handled by the network interface cards that the respective modem is wired to on each end of the fiber link.

Bits 12 and 13 of the fiber frame 70 (FIG. 3) are dedicated to transmission of network or RUI communication. Network communication may be, for example, at 57.6 k or 9600 baud, optionally. RUI may operate, for example, at 9600 baud. At 57.6 kHz, or 17.4 us per bit, a single sample per frame (per 1.3 us) imposes 1.3 us jitter on the digital stream. This corresponds to 7% of a bit width (1.2% of a bit at 9600 bps), which should be acceptable to the receiver. If this jitter is not acceptable, the outgoing data may be reframed. The reframing would create nominal bit time transitions, delayed by approximately one-half a bit time from the input.

Spare and Parity

Bit 14 is available for future expansion. It could be used, for example, for any signal for which a 768 kHz sampling rate would be sufficient, such as a fire fighter phone or other communications. If the signal were synchronous with the local clock, then the full 768 kHz bandwidth could be used. Alternatively the bandwidth could be reduced according to the allowable error on the connected equipment.

Bit 15 contains an even parity bit of the fiber frame 70, excluding the synchronization word. Parity checking was chosen for simple error detection on the fiber since a relatively short word (12 bits) is tested, and because each input is supervised by its respective connected equipment.

General Purpose Status & Control

As described above, four bits 83 are available within the analog data frame (ADF) 80 (FIG. 4) for general-purpose status and control. These bits are formatted such that eight bits of data can be communicated. This data may be used to communicate any required status and/or control information between modems, such as network direction control, reset status, etc.

FPGA Design

Figure 5:
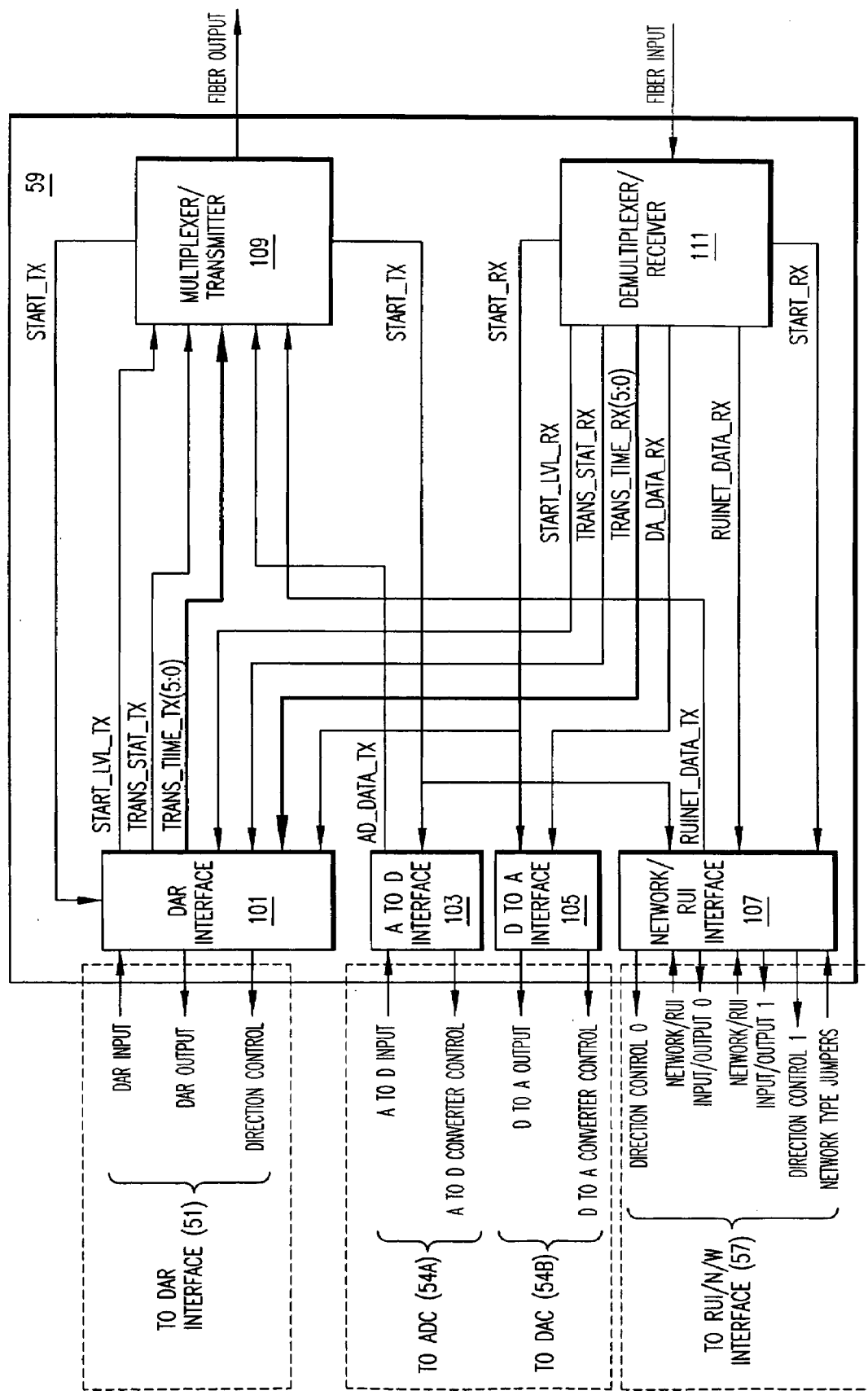
FIG. 5 is a block diagram of the field programmable gate array (FPGA) of FIG. 2.

FIG. 5 is a block diagram of the FPGA 59 of FIG. 2.

The FPGA 59 comprises two largely distinct modules: a receive side and a transmit side. The optical channel, implemented as a wavelength division multiplexed (WDM) channel, is a full-duplex medium. The FPGA 59 gives no consideration to the timing relationship between the transmit and receive sides. Internal to the FPGA 59, each of the transmit and receive sides operates constantly. Note that data transmitted on the fiber is one fiber frame (1.3 us) behind the data on the input.

The terms "TX" and "RX" throughout most of this description are with respect to the optical interface, while the terms "IN" and "OUT" are with respect to the wired interface. The terms "input stream" and "output stream" are with respect to the optical interface.

Digital Audio Riser (DAR) Interface Module 101

The DAR interface module 101 receives an asynchronous digital audio signal from the external DAR interface 51 (FIG. 2) and compresses the signal to an 8-bit parallel value as described above. The DAR interface module 101 then provides its output to the multiplexer/transmitter module 109.

The DAR interface module 101 also receives data in the same format from the demultiplexer/receiver module 111, decompresses the data, and transmits it serially back out of the device. The compression operation compresses sixty-four 49.152 MHz samples as follows (refer to FIG. 3):

Frame bit 3: Start Level. This bit is the actual logical state of the first sample of the DAR.

Frame bit 4: Transition Status. This bit indicates whether or not a logic transition took place during the frame. A transition may not occur for two reasons: either there were actually two subsequent bits on the DAR at the same level, or the clock source to local clock difference and timing coincides such that one DAR bits transition falls on either side of a sample period.

Frame bits 5-10: Transition Timing 0-5. These six bits indicate when a transition took place.

In the event that an edge occurs 'prematurely' (two transitions within a sample period), then the second edge is only extended by one clock cycle. In the event of a corrected bit width resulting from a DARIC correction (which would be sixty local clocks instead of sixty-four), then the correction is redistributed over two DAR bits instead of the one bit that the correction was contained in previously. This should be well within the correction window limits of a subsequent DARIC.

In the unlikely event that the correction distribution discussed above is a problem, there may be several possible ways to rectify it. For example, the spare bit (bit 14 in FIG. 3) in the fiber frame 70 can be used to transmit a "dual-transition" bit. If this bit were set, then the receiver would automatically output a transition sixty clocks after the first transition whose timing was conveyed in the timing word. Alternatively, since there are only sixty-three possible transition timing values (since the first sample is actually transmitted uncompressed), the $64^{th}$ value could be used to indicate that a "dual-transition" occurred, and the same action as in alternative '1' can be taken.

Analog Audio Interface Modules 103, 105

The analog audio interface modules 103, 105 are responsible for controlling the ADC 54A (FIG. 2) and the DAC 54B (FIG. 2). Both converters 54A, 54B require the same control signals. For the ADC 54A, these signals may be generated through division of the local clock. For the DAC 54B, these signals may be generated locally, but reset each frame by the received framing word. An off-chip phase-locked-loop (not shown), such as a 74HCT4046A, can be used to assure that the DAC 54B receives the appropriate number of system clocks per left-right clock. The DAC interface 105 receives incoming (i.e., from the optic fiber) analog data frames 80 (FIG. 4) from the demultiplexer/receiver module 111. The DAC interface 105 decodes the frame, and provides the data serially to the DAC 54B (FIG. 2). The analog data may be, for example, 16-bit, Mu Law compressed to 8-bit for transmission over the fiber.

As previously discussed, the analog audio interface modules 103, 105 may also be responsible for communication of status and control information. Four bits available within the ADF 80 may be formatted to contain eight bits of status and control information, for example, as shown in Table 2 below. The bits may be updated, for example, at a rate of once every 500 us. Any status change reaches the mating modem within 500 us. Table 3 shows the definitions applied to the various status and control bits (STAT_CNTLx) of Table 2.

TABLE 2

ADF control bit selects
ADF Control Bit assignments

| Group Select | | Data | |
|---|---|---|---|
| 3 | 2 | 1 | 0 |
| 0 | 0 | STAT_CNTL2 | STAT_CNTL1 |
| 0 | 1 | STAT_CNTL4 | STAT_CNTL3 |
| 1 | 0 | STAT_CNTL6 | STAT_CNTL5 |
| 1 | 1 | STAT_CNTL8 | STAT_CNTL7 |

TABLE 3

Status and Control bit assignments

| STAT_CNTL number | Assignment | Details |
|---|---|---|
| 1 | Reset flag | Reset signal to/from mating modem. Corresponds to reset at the remote reset input. |
| 2 | Analog ch1 flag | Riser channel status change flag. 0 = normal; 1 = fault |
| 3 | Analog ch2 flag | Riser channel status change flag. 0 = normal; 1 = fault |
| 4 | RUI flag | RUI channel status change flag or attempt reset flag (depending on modem configuration). 0 = no change; 1 = change |
| 5 | Fiber fault LED flag | Signal to mating modem indicating a fiber fault. It is possible that one modem is capable of receiving, but not the other. This assures that both modems indicate the fault if there is one. |
| 6 | Fiber trouble | Signal to mating modem indicating a fiber trouble. It is |

TABLE 3-continued

Status and Control bit assignments

| STAT_CNTL number | Assignment | Details |
|---|---|---|
| | flag | possible that one modem is capable of receiving, but not the other. This assures that both modems enter degraded mode if either modem cannot receive. |
| 7 | Not used. | Available for future expansion. |
| 8 | Not used. | Available for future expansion. |

The analog audio interface also has the capability to operate in an "Enhanced Analog Audio" (EAA) mode. Standard analog audio imposes a six-modem pair limit due to distortion and noise increases each time the analog audio is converted to and from digital. EAA imposes its own limitations, but eliminates the six-modem pair limit. This can be accomplished by routing the received analog data frame 80 to the DAR wiring interface 51 (FIG. 2), thus passing the ADF directly to the next modem, in parallel with the analog riser. The result is that the receiving modem does not need to re-digitize the audio signal from the analog audio riser, and no distortion or noise is added. Downstream modems may be configured to enable or disable EAA, and to select whether or not the modem has the DAR wired as the EAA input.

Network/RUI Interface Module 107

The network/RUI interface module 107 (FIG. 5) is the simplest module, since the speed of the fiber frame is dramatically higher than the speed of either the network communications or RUI, and it is the least sensitive to jitter of all interfaces. This module samples the input once per fiber frame, and makes the sampled data available to the multiplexer/transmitter module 109. This module also receives parallel network/RUI data back from the receiver/demultiplexer module 111 and transmits it serially out the local side. The network/RUI module 107 is also responsible for direction control of the RS485 transceivers.

Multiplexer/Transmitter 109

The multiplexer/transmitter module 109 receives parallel data from each of the interface modules 101-107 once every fiber frame. It generates a synchronization word, and inserts all data into the fiber frame 70 depicted in FIG. 3. The multiplexer/transmitter module 109 is the controlling module for the synchronous sampling and packaging of all input data. It indicates to each of the input modules when a start-of-frame has occurred, so that each module knows when to prepare a new set of samples.

Demultiplexer/Receiver 111

The demultiplexer/receiver 111 receives the fiber frame 70 from the optical interface. It continuously samples the input in search of a synchronization word. Upon detecting a synchronization word, the module 111 samples each bit of the frame at the proper interval to recover the data. It then feeds this data in a parallel format back to each of the local interface modules 101-107, also sending a start-of-frame pulse to indicate to each of the modules the proper time to update respective output.

Routing/Direction Control

The FPGA 59 must control the off-chip direction controls to the interface transceivers on the "local" side of the card. The off-chip direction control can be handled as follows:

DAR Interface: A two-second counter (not shown) in the FPGA 59 generates a detection time-out. The FPGA monitors for the presence of an active DAR on the input, and switches the direction control output if no DAR is detected after the expiration of the time-out. This function continues to toggle the direction control output every two seconds until an active DAR is detected.

Analog Interface: Analog routing control is accomplished through detection of an end-of-line resistor (EOLR), using logic to produce the appropriate reaction based on each module's configuration. Depending on the configuration of a particular modem, as well as its current status, it will change its state contingent upon either the failure to detect the EOLR or a flag sent by its mate. Note that, in one embodiment of the present invention, the EOLR is present on the receiving modem for class B applications, and is present on the transmitting modem for class A.

RUI Interface: RUI routing control is accomplished by an algorithm implemented in logic that recognizes electrical changes on the wiring and associates such changes with higher-level state-changes. Since there are no data direction control requirements for RUI, the FPGA 59 pays no attention to actual traffic flow on this interface. Voltage mode data on the input and current mode responses are passed through any time they are received. Continuity of the wiring is supervised via the DC component of the communications.

Figure 6A:
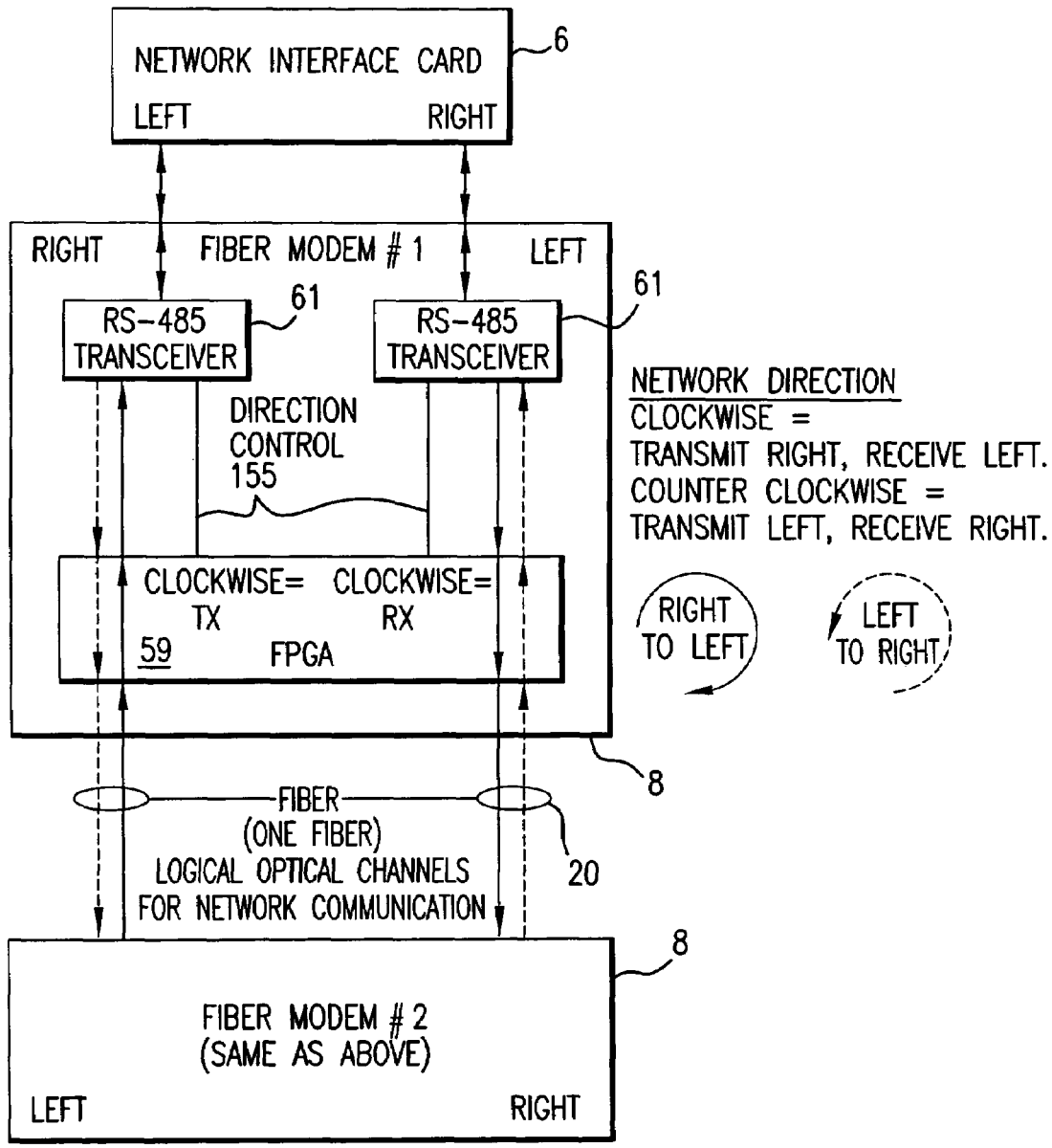
FIG. 6A is a block diagram graphically depicting the direction control functionality of a network interface with an embodiment of the present invention.

Network Interface: FIG. 6A is a block diagram graphically depicting the direction control functionality of the network interface. A "bridge" configuration is shown for simplicity. Two RS-485 transceivers 61 interface with the left and right interfaces of a network interface card 6. The FPGA 59 monitors for a negative going edge (start bit) on the optical side input of each network channel. When a transition is detected, the direction control switches such that the data is transmitted out the local side. Once one character period (based on network speed and protocol) has passed, the direction control reverts to receive mode. The actual transmit enable pulse is one half of one bit time shorter than the entire character length. The result of this timing is that the direction control reverts to receive mode half way through the stop bit, which is a logic high. As a result, the network data should be unaffected, and this half bit advance provides ample time for the monitor circuit to resume searching for the next negative going edge. Both the optical transmit and receive are always enabled, since the two directions are on two separate wavelengths and cannot interfere with one another.

Figure 6B:
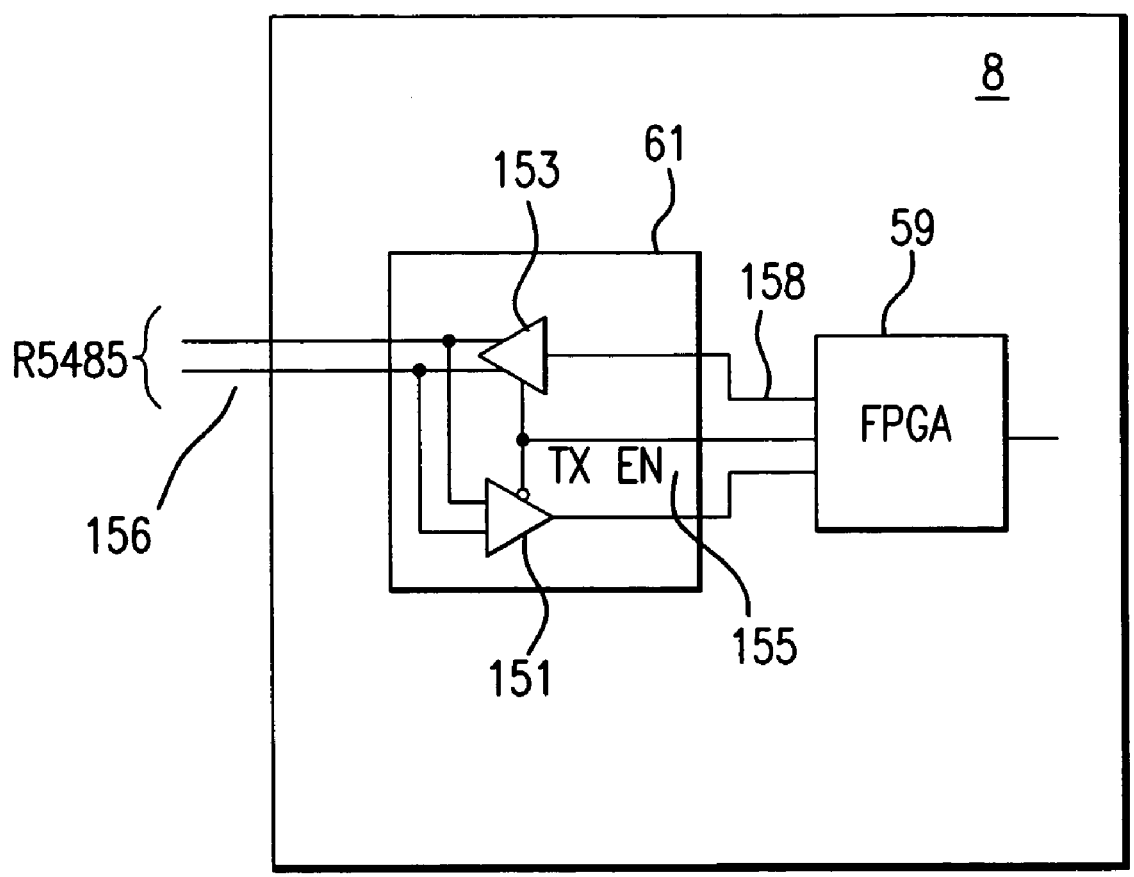
FIG. 6B provides further detail of the direction control functionality.
Figure 6C:
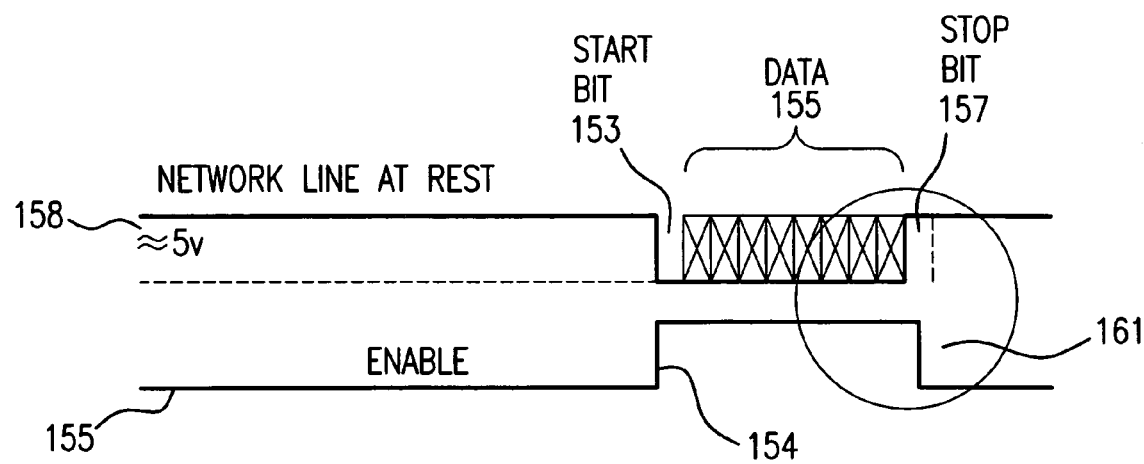
FIG. 6C is a timing diagram showing an incoming stream received and demultiplexed from the fiber.
Figure 6D:
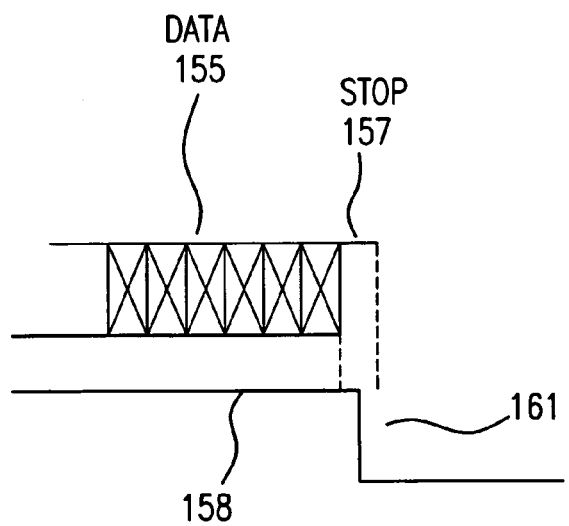
FIG. 6D provides a detail of the circled portion of FIG. 6C.

FIGS. 6B-6D illustrate this concept at a slightly lower level. FIG. 6B again shows a modem 8 with, for simplicity, just one of the network/RUI RS485 transceivers 61. The transceiver 61 has a driver 153 for transmitting data and a receiver 151 for receiving data. Data is transmitted and received on a single differential pair of wires 156. To control the direction, the FPGA 59 controls a transmit enable signal 155, which is normally not asserted, such that the transceiver 61 defaults to a receive mode.

As seen in the timing diagram of FIG. 6C, an incoming stream 158 received and demultiplexed from the fiber is normally at some level, say 5VDC, when inactive, i.e., at rest. At the same time, the transmit enable signal 155 is normally low so that the receiver 151 is enabled to receive network or RUI communications, and the transmitter 153 disabled.

When a start bit 153 is detected in the incoming stream 158, the FPGA 59 asserts the transmit enable signal 155 at 154, while passing the communications data to the driver 153, which begins transmitting the data immediately. The transmit enable signal 155 remains asserted for a fixed period, covering the start bit 153, the data 155 (which in one embodiment may be eight or nine bits), and half of the stop bit 157.

FIG. 6D is a detail of the circled portion of FIG. 6C, illustrating that the transmit enable signal 155 is de-asserted at 161, halfway through the stop bit 157.

Error Detection and Trouble Reporting

The primary responsibility of error detection and reporting lies with the connected equipment. In the event of a card failure, the connected equipment may perceive the following errors:

DAR: DAR interface cards (not shown) within control panels or transponders supervise receipt of the DAR signal, and pass a trouble indication to the connected transponder interface card (TIC) in the event of a DAR failure.

Analog Riser: Any connected analog risers are monitored by the analog audio controller and the riser interface card (RIC), and any amplifiers via monitoring of the supervision tone, and monitoring of the end-of-line resistors.

Class A Analog Audio

Class A analog audio operation forms a loop beginning with an audio controller in a fire alarm control panel. Audio is sent from the audio controller class B output, i.e., the "primary," to the various transponders on a loop, and wired for verification at the analog audio controller class A return. This way, the audio controller can determine whether there is a break or fault in the loop. However, when the present invention modem is put into place, optical fibers replace one or more links in the loop, and there is no longer a complete electrical path from the audio controller's class B output to its class A return. Normal verification of the path cannot be done under these circumstances.

Figure 7A:
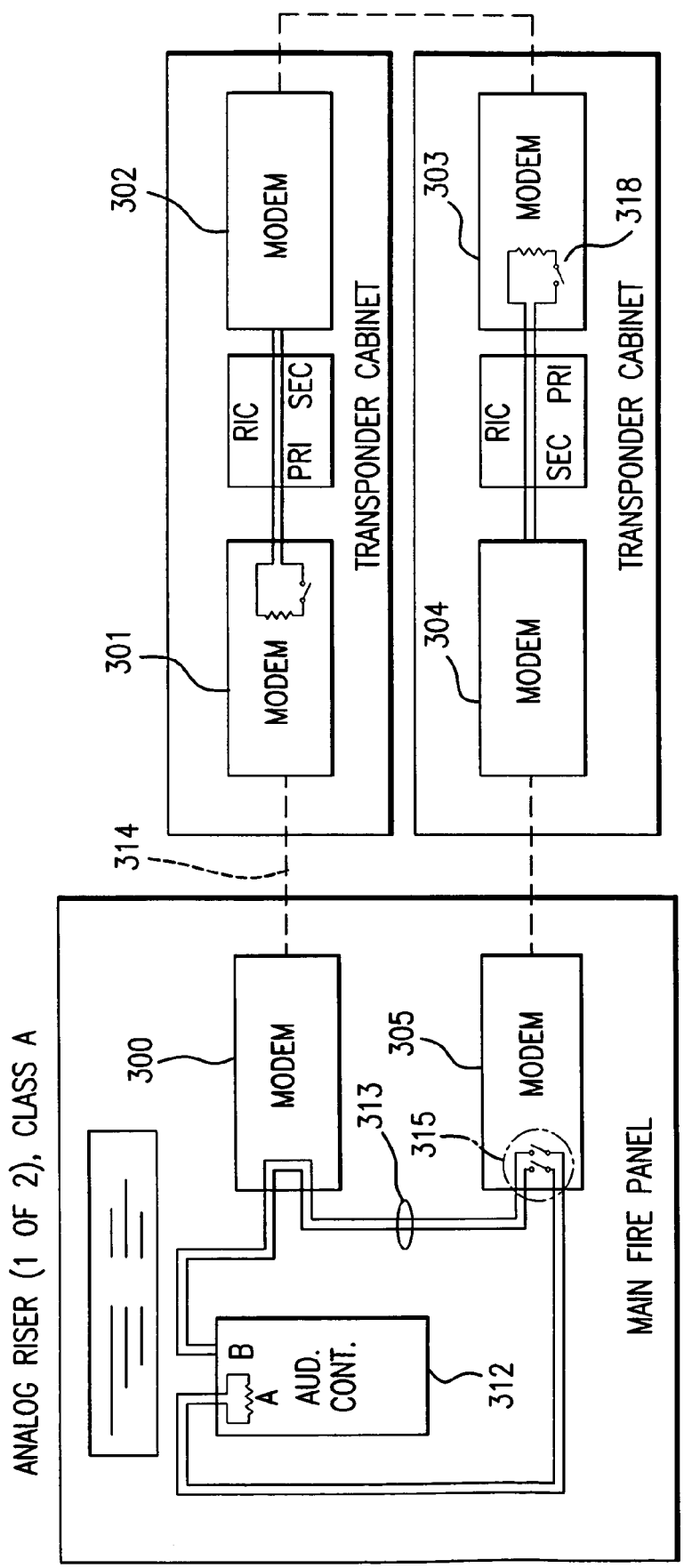
FIG. 7A is a schematic diagram illustrating the use of a present invention cross-link in a Class A network configuration to notify the audio controller of a fiber optic failure or a wiring fault.

FIG. 7A is a schematic diagram illustrating the use of a cross-link (x-link) 313 to notify the audio controller 312 of a fiber optic failure, or a wiring fault on the opposite side of the optical isolation described above. The various modems 300-305 within the loop are able to detect a fault in the loop and can communicate this fault information to the tail end modem 305 using ADF control bits as described above, and between wire-connected modems (e.g. 303, 304) by removing an end-of-line resistor (EOLR), e.g., 318.

As shown in FIG. 7A, analog audio is transmitted from the audio controller 312 "Class B" output to the head end fiber optic multiplex modem 300, which multiplexes the data with other data, e.g., RUI (not shown), and transmits the multiplexed output stream to the next transponder in the loop via optic fiber 314. As far as the audio controller 312 is concerned, the loop appears normal because the cross-link 313 between the two modems 300, 305 completes the electrical loop. When a problem is detected, the problem information is sent to the tail end modem 305. However, the fiber optic multiplex modem of the present invention is "transparent," i.e., it cannot communicate this information directly to the audio controller. Instead, modem 305 opens switches 315, thus breaking the electrical loop. The audio controller 312 interprets this open loop as a fault and begins transmitting audio out both the class B output and the class A return.

Figure 7B:
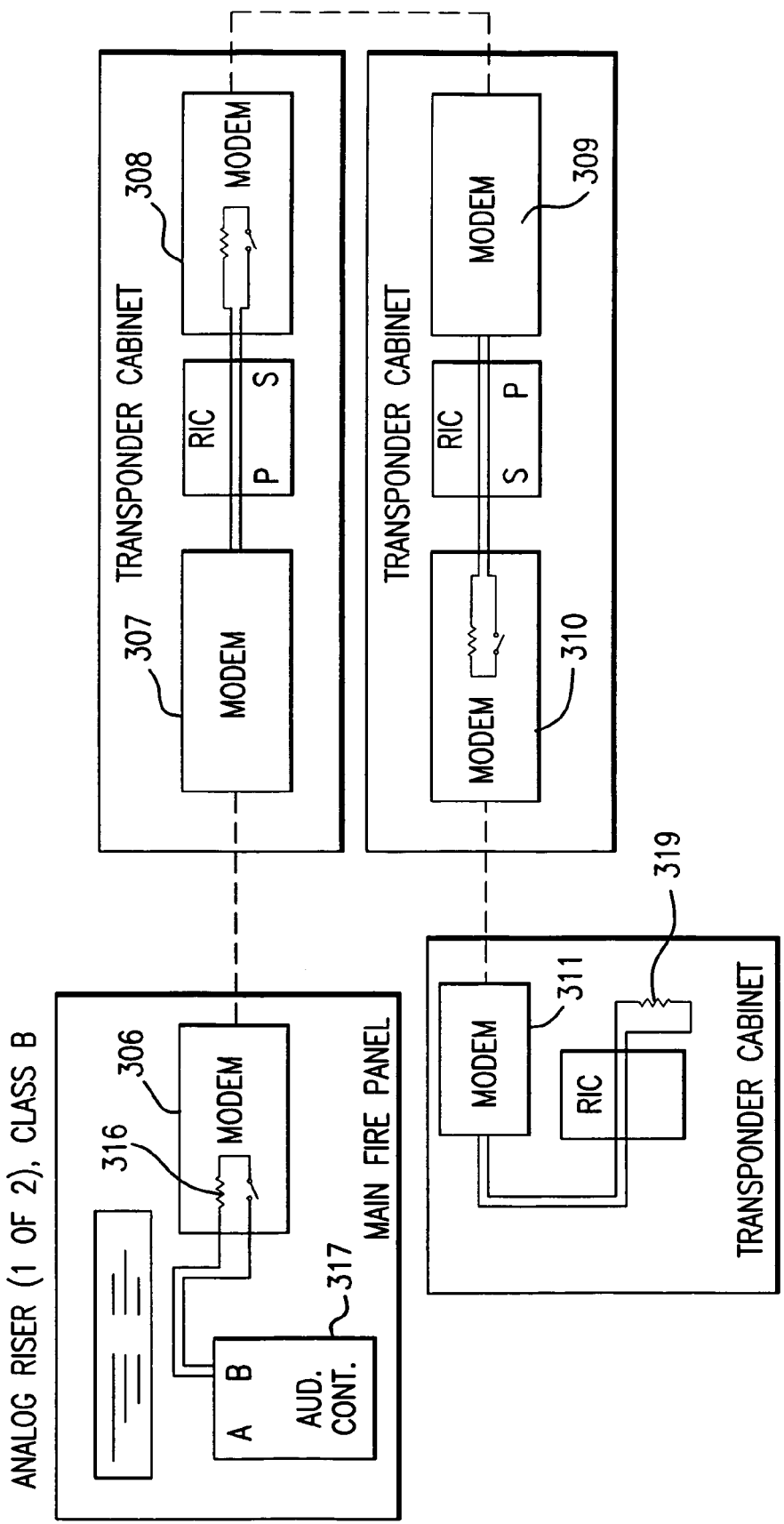
FIG. 7B is a schematic diagram illustrating Class B analog audio supervision using end of line (EOL) resistors in the present invention modems.

As shown in FIG. 7B, Class B analog audio supervision is accomplished by monitoring an EOLR. A prior art system would typically have a single EOLR at the end of the analog riser (across the wires). Where present invention fiber optic multiplex modems are installed, the final EOLR 319 is not electrically connected across the system. Therefore, certain modems 306, 308, 310 themselves present an EOLR 316 across the wires, and supervise downstream for the same. Referring to FIG. 7B, modem 306 presents EOLR 316, which the audio controller 317 monitors. Modem 307 monitors for the EOLR, which is presented by modem 308, and so forth. If any modem fails to detect an EOLR, then it conveys that information to its mate via the status and control packet within the ADF as described above. The modem receiving this information then opens its EOLR switch, e.g., 316, to covey the fault back upstream. When modem 306 opens its EOLR 316, the audio controller 317 no longer detects the EOLR, and reports the trouble at the user interface.

Network: Network communications is inherently supervised by the transmitted intelligence; in the event that the network fails, the connected equipment is unable to respond to polls, and therefore a network trouble is reported.

RUI: Since RUI is a master/slave protocol, a failure of the fiber is perceived as a failure of all connected devices, and hence the RUI channel itself.

Class A RUI operation forms a loop beginning with the RUI interface in a fire alarm control panel. RUI data is sent, from the RUI interface class B output, around the loop to the various transponders on the loop, and received for verification at the RUI interface class A return. This way, the RUI interface can determine whether there is a break or fault in the loop. However, when the present invention modem is put into place, optical fibers replace one or more links in the loop, and there is no longer a complete electrical path from the RUI interface's class B output to its class A return. Verification of the path cannot be done under these circumstances.

Figure 7C:
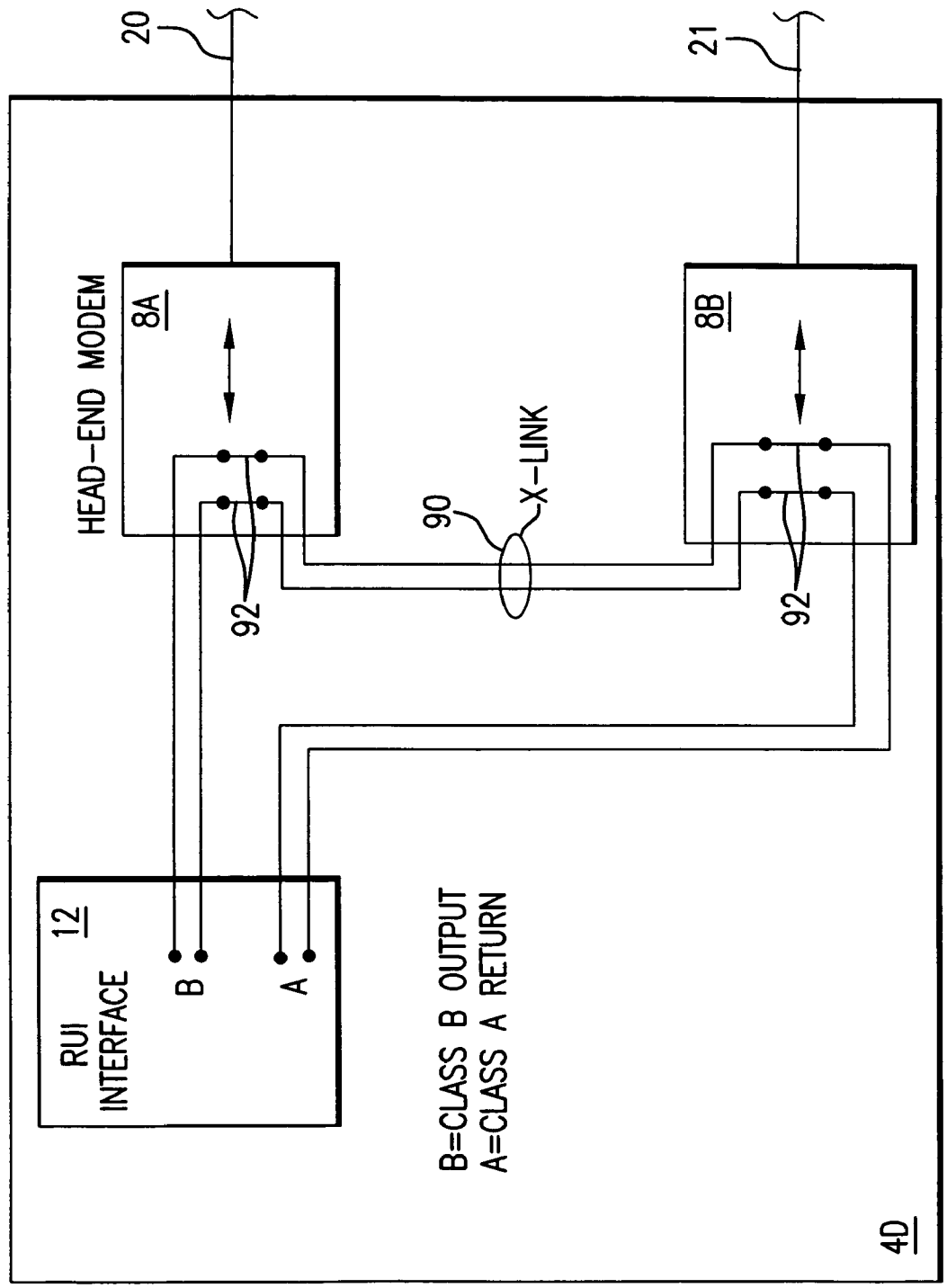
FIG. 7C is a schematic diagram illustrating the use of a present invention cross-link to notify a RUI interface of a fiber optic failure.

FIG. 7C is a schematic diagram illustrating the use of a cross-link ("x-link") 90 to notify the RUI interface 12 of a fiber optic failure. The reference numbers are intended to correspond with those of FIG. 1 for exemplary purposes. The various modems within the loop (including those shown in FIG. 7C, as well as those not shown, for example, within the transponders 22 of FIG. 1) are able to detect a fault in the loop and can communicate this fault information to the tail end modem 8B using ADF control bits as described above.

As shown in FIG. 7C, RUI data is transmitted from the RUI interface 12 "Class B" output to the head end fiber optic multiplex modem 8A, which multiplexes the data with other data, e.g., audio data (not shown) and transmits the multiplexed output stream to the next transponder on the loop via optic fiber 20. However, as far as the RUI interface 12 is concerned, the loop appears normal because the cross-link 90 between the two modems 8A, 8B completes the electrical loop. When a problem is detected, the problem information is sent to the tail end modem 8B. However, the fiber optic multiplex modem of the present invention is "transparent," i.e., it cannot communicate this information directly to the RUI interface. Instead, modem 8B opens switches (or relays) 92, thus breaking the electrical loop. The RUI interface 12 interprets this open loop as a fault and begins transmitting RUI data out both the class B output and the class A return.

In addition to the supervision that the connected equipment provides, an embodiment of the fiber optic modem may provide LED indicators for each of the interfaces. Although not capable of detecting all troubles, the modem can use these LEDs to indicate some trouble conditions, such as a fiber fault or degraded mode operation on RUI or analog channels.

A second trouble indicating method may be used. Generally, an open circuit on a class A loop may be generated on the modem's output in the event of a fiber communication failure so that a degraded mode of operation is entered by the receiving circuit. This function may be required so that a fault on the source side of the fiber invokes the appropriate response on the output side. Alternatively, a modem may also generate a short circuit on the local side, to duplicate the actual nature of the fault.

An embodiment of the present invention modem has two types of fiber fault conditions: "fiber fault" and "fiber trouble". A fiber fault condition only effects the fiber fault LED, while a fiber trouble condition invokes a degraded mode operation, if applicable to a particular interface. Fiber faults may occur without fiber troubles, but fiber troubles will never occur without fiber faults (LED indication). A fiber fault condition may be triggered, for example, by momentary loss of synchronization or a single parity error. The fiber fault LED lights for ½ second in the event of any problem with the optical data path. The fiber trouble condition is determined by continued parity errors or failure to synchronize for an extended period (e.g., 125 us). In the event of a fiber trouble condition, analog audio and RUI enter a degraded mode operation or report wiring faults, depending on style of operation, and troubles might be latched by the panel depending on their nature.

To allow operation with fiber troubles (but not fiber faults), filtering can be applied to the flags that are exchanged between modems. The filtering prevents erroneously receiving a flag while corrupt data is being received, and increases the likelihood that a flag sent during imperfect operation will be received. A flag missed due to corrupt data may cause a delay equivalent to the duration of the fault condition for all interfaces except RUI, where it could cause a worst case delay of 14 s (the modem's automatic recovery time of a class A RUI loop). Tests have indicated that fiber faults do not occur over single mode fiber with 20 dB of attenuation, but do occur once every few days over multimode fiber of 5000 feet plus an air gap attenuator to total 6 dB. Fiber troubles have not occurred with 20 dB single mode or 15,000 feet and 12 dB of multimode.

Definitions

ADF: Analog Data Frame. An embodiment of the Fiber Optic Modem encodes two channels of 32 ksps audio data in a format called the analog data frame. Although a particular format is described above, it would be obvious to one skilled in the art that other formats may be used as well.

DAR: Digital Audio Riser. The DAR media interface is an RS485 interface that acts as a "pass through" device that operates the same as a DARIC interface.

DARIC: Digital Audio Riser Interface Card. The interface card that is normally used within a control panel or a transponder as a connection point and receiver/regenerator for the Digital Audio Riser.

EAA: Enhanced Analog Audio. This refers to the feature that allows the ADF to be transmitted digitally on the DAR channel in parallel with the analog channel (etc.), thereby allowing a digitized analog riser to reach all modems with this feature enabled without being converted to analog and back in between.

RUI: Remote Unit Interface—RUI interface transmits data to transponders as a voltage level and receives data back as current.

TIC: Transponder Interface Card—The TIC resides in a transponder and transmits data to the RUI interface or RUI card as current and receives data as voltage. The TIC interface also monitors the integrity of the wires when required.

EXAMPLE CONFIGURATIONS

Figure 8A:
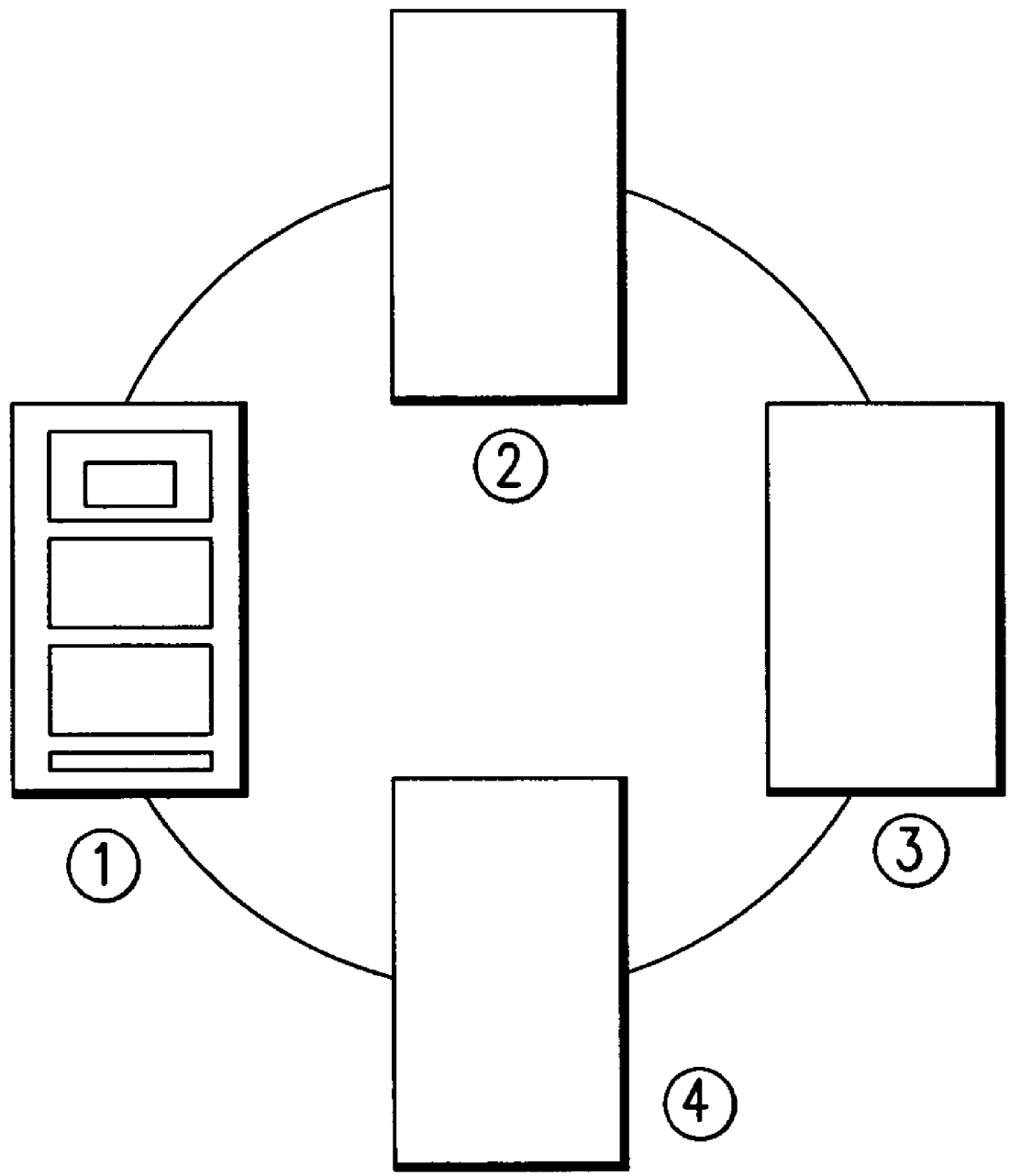
FIG. 8A is a schematic diagram illustrating the use of an embodiment of the present invention in an internal building or multi-building Class A configuration.

FIG. 8A is a schematic diagram illustrating the use of an embodiment of the present invention in an internal building or multi-building Class A configuration. FIGS. 8B-8F show sample configurations for various interfaces for the system of FIG. 8A. The system shown could represent, for example, four control panels within a single building, or alternatively, four buildings each with one panel. Of course, other combinations may be configured with varying numbers of panels per building.

Figure 8B:
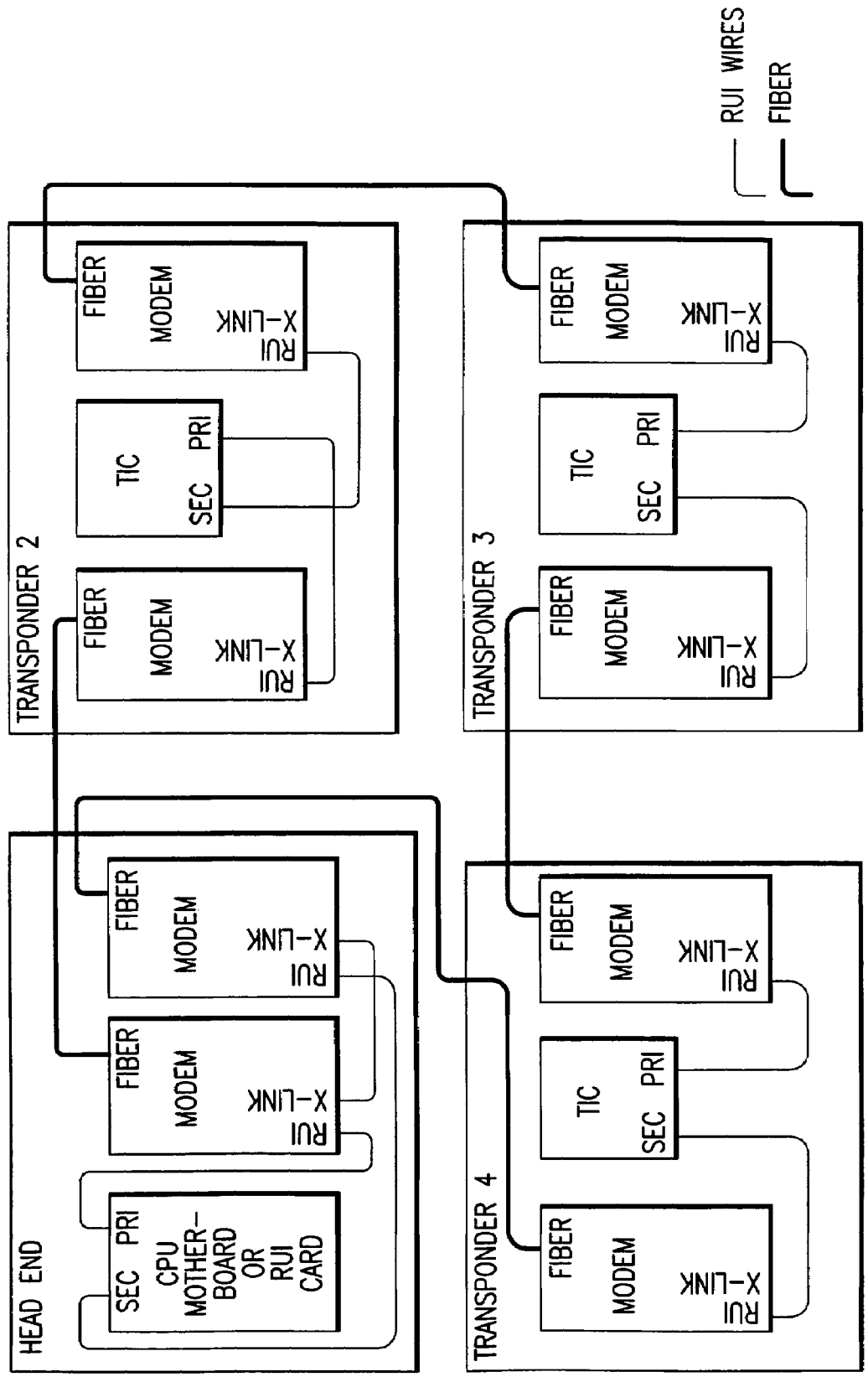
FIG. 8B is a schematic diagram illustrating the configuration of the RUI interfaces of the system of FIG. 8A.

FIG. 8B is a schematic diagram illustrating the configuration of the RUI interfaces of the system of FIG. 8A.

Figure 8C:
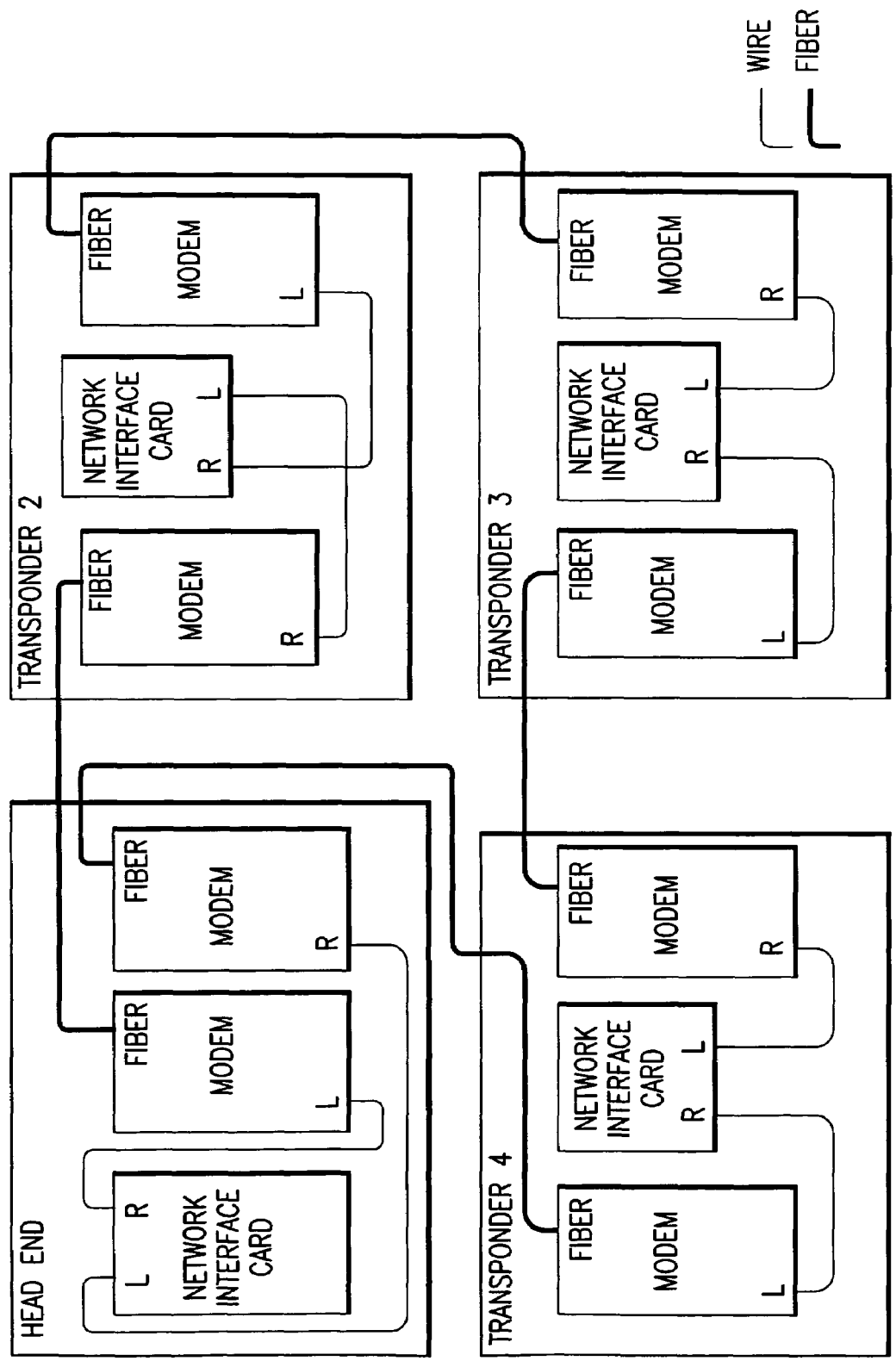
FIG. 8C is a schematic diagram illustrating the configuration of the network interfaces of the system of FIG. 8A.

FIG. 8C is a schematic diagram illustrating the configuration of the network interfaces of the system of FIG. 8A. Note that at least one embodiment of the modem does not support the concurrent use of both the RUI and network interfaces.

Figure 8D:
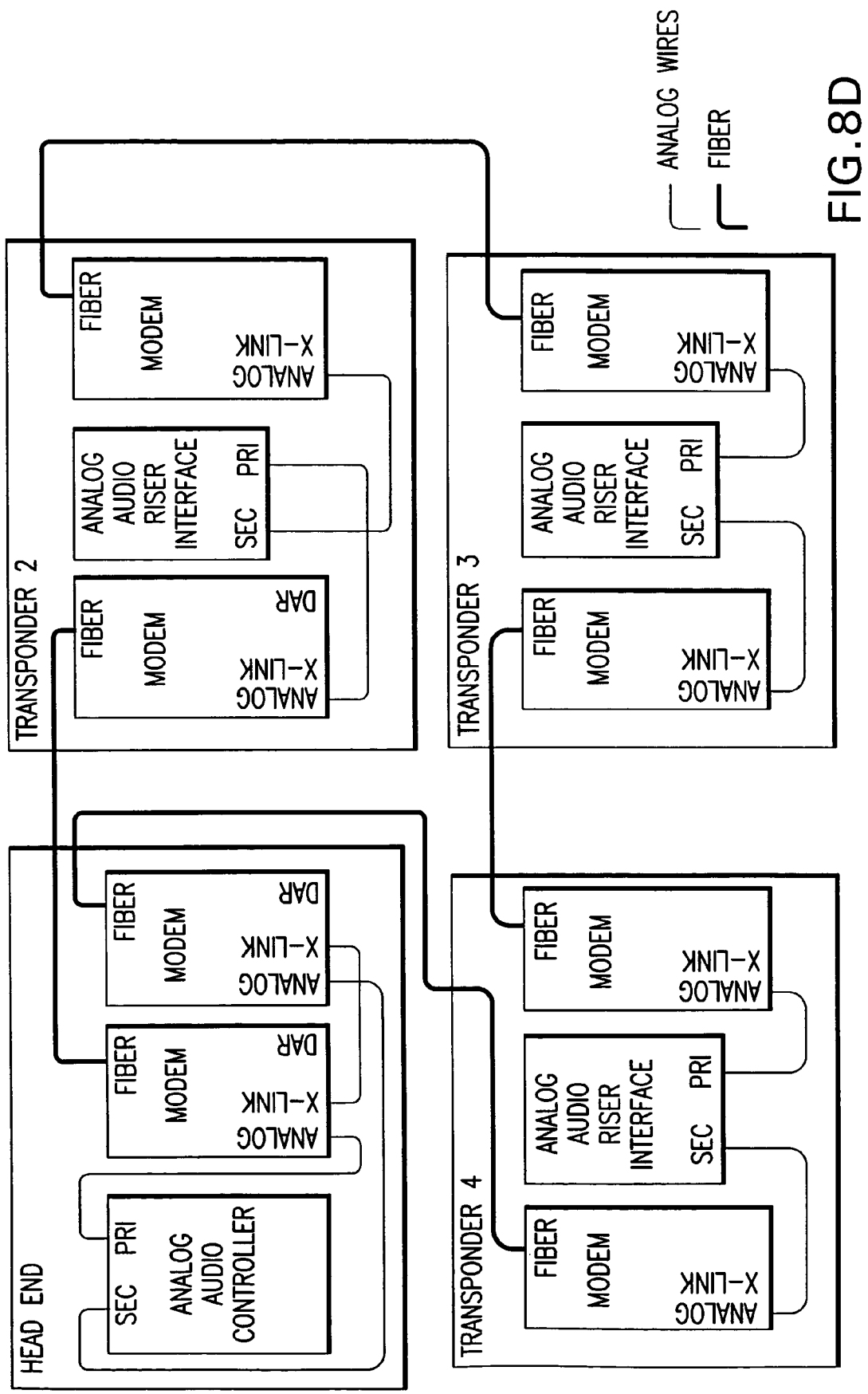
FIG. 8D is a schematic diagram illustrating the configuration of the analog audio interfaces of the system of FIG. 8A.

FIG. 8D is a schematic diagram illustrating the configuration of the analog audio interfaces of the system of FIG. 8A.

FIG. 8E is a schematic diagram illustrating the use of the enhanced analog audio (EAA) feature within the system of FIG. 8A.

Figure 8F:
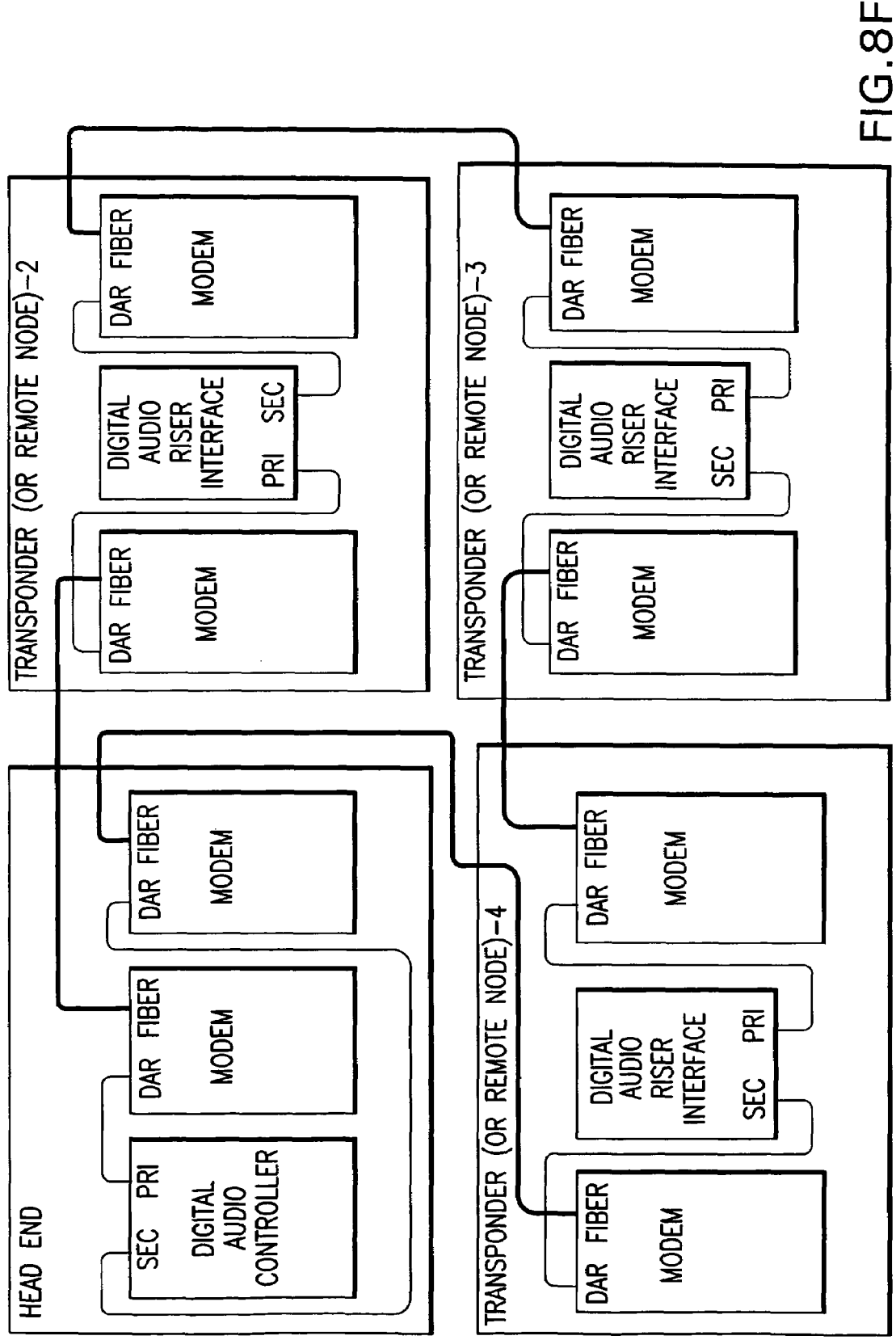
FIG. 8F is a schematic diagram illustrating the configuration of the digital audio interfaces of the system of FIG. 8A
Figure 9A:
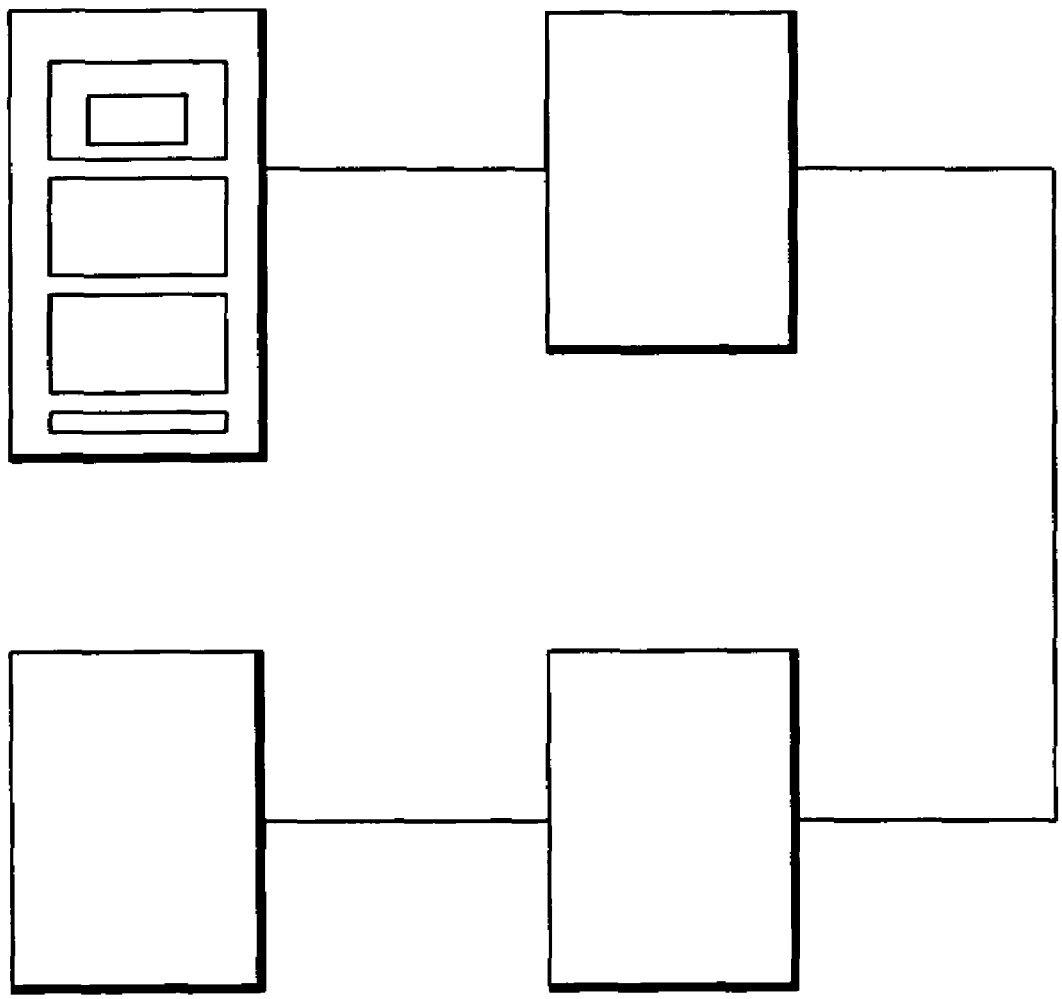
FIG. 9A is a schematic diagram illustrating the use of an embodiment of the present invention in an internal building or multi-building Class B configuration.

FIG. 8F is a schematic diagram illustrating the configuration of the digital audio interfaces of the system of FIG. 8A FIG. 9A is a schematic diagram illustrating the use of an embodiment of the present invention in an internal building or multi-building Class B configuration.

Figure 9B:
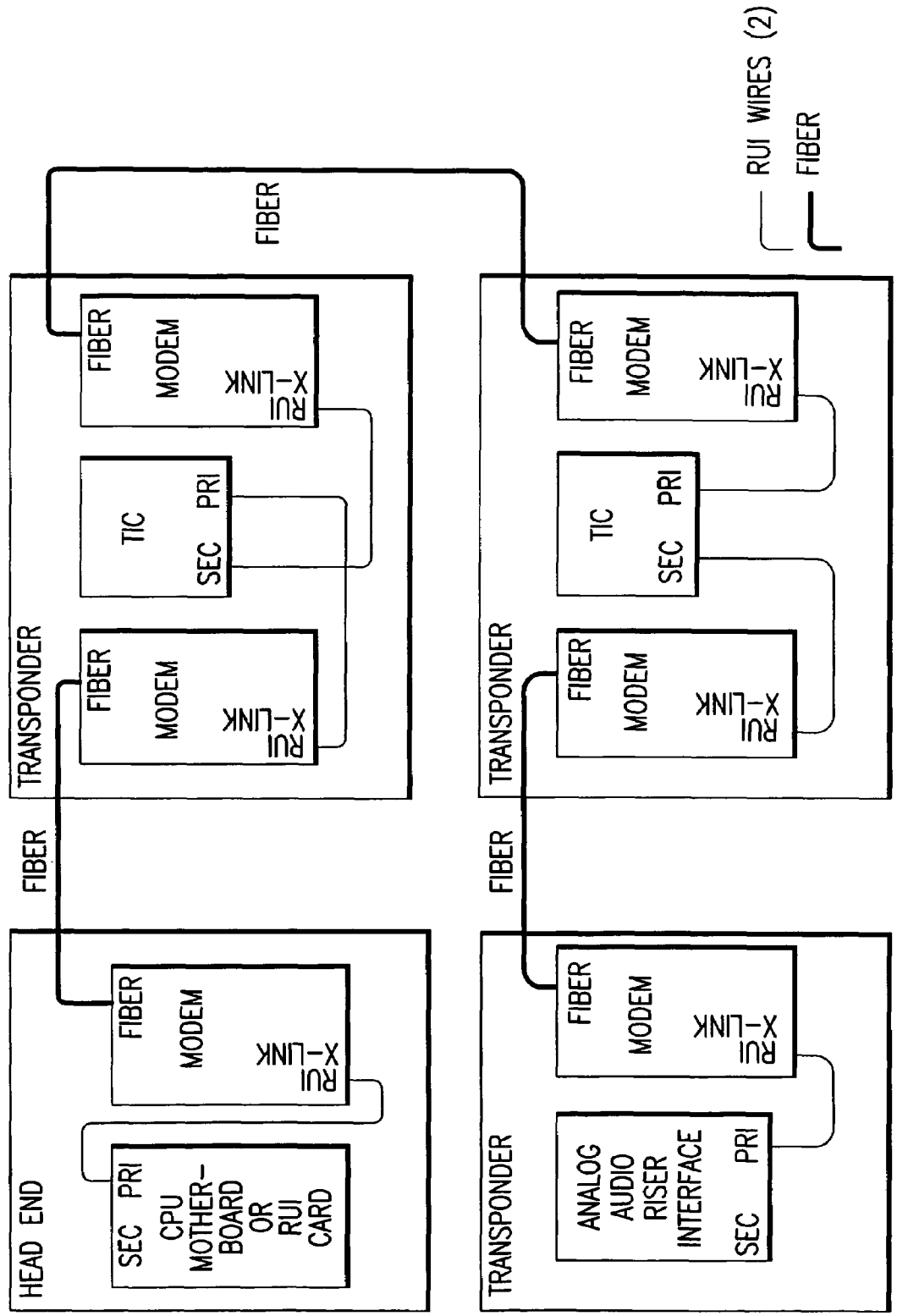
FIG. 9B is a schematic diagram illustrating the configuration of the RUI interfaces of the system of FIG. 9A.

FIG. 9B is a schematic diagram illustrating the configuration of the RUI interfaces of the system of FIG. 9A.

Figure 9C:
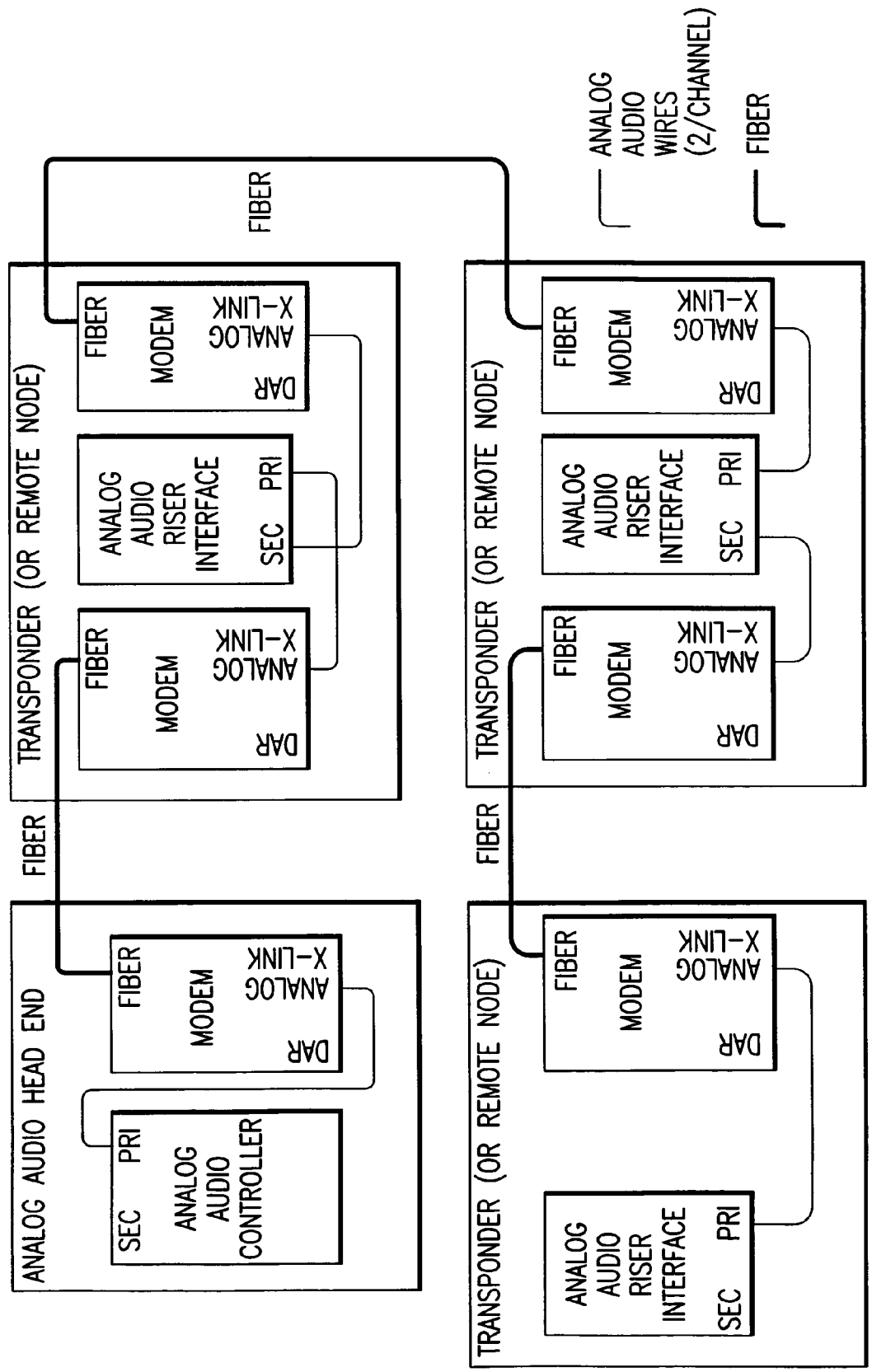
FIG. 9C is a schematic diagram illustrating the configuration of the analog audio interfaces of the system of FIG. 9A.

FIG. 9C is a schematic diagram illustrating the configuration of the analog audio interfaces of the system of FIG. 9A.

Figure 9D:
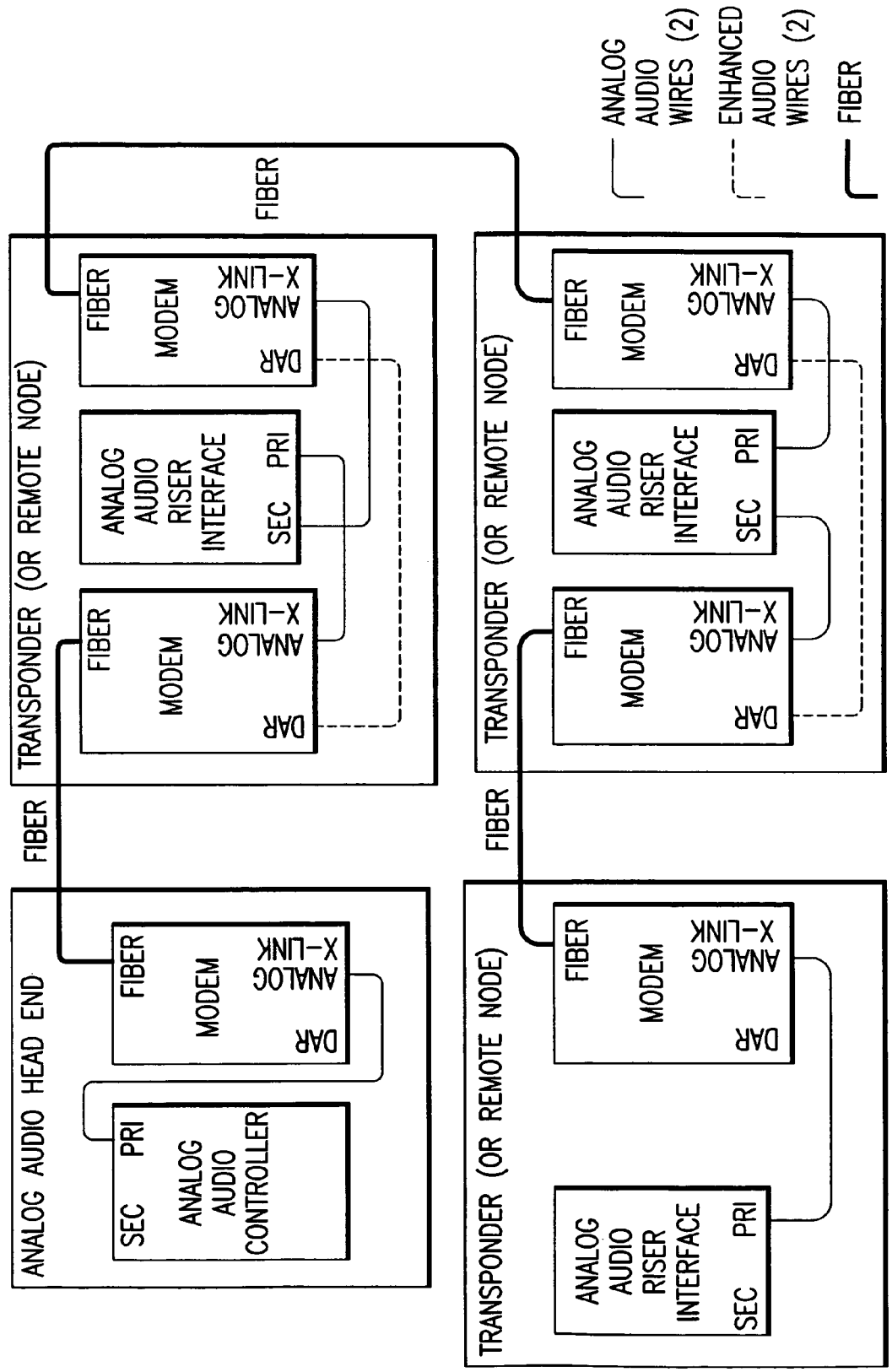
FIG. 9D is a schematic diagram illustrating the use of the enhanced analog audio (EAA) feature within the system of FIG. 9A.

FIG. 9D is a schematic diagram illustrating the use of the enhanced analog audio (EAA) feature within the system of FIG. 9A.

Figure 9E:
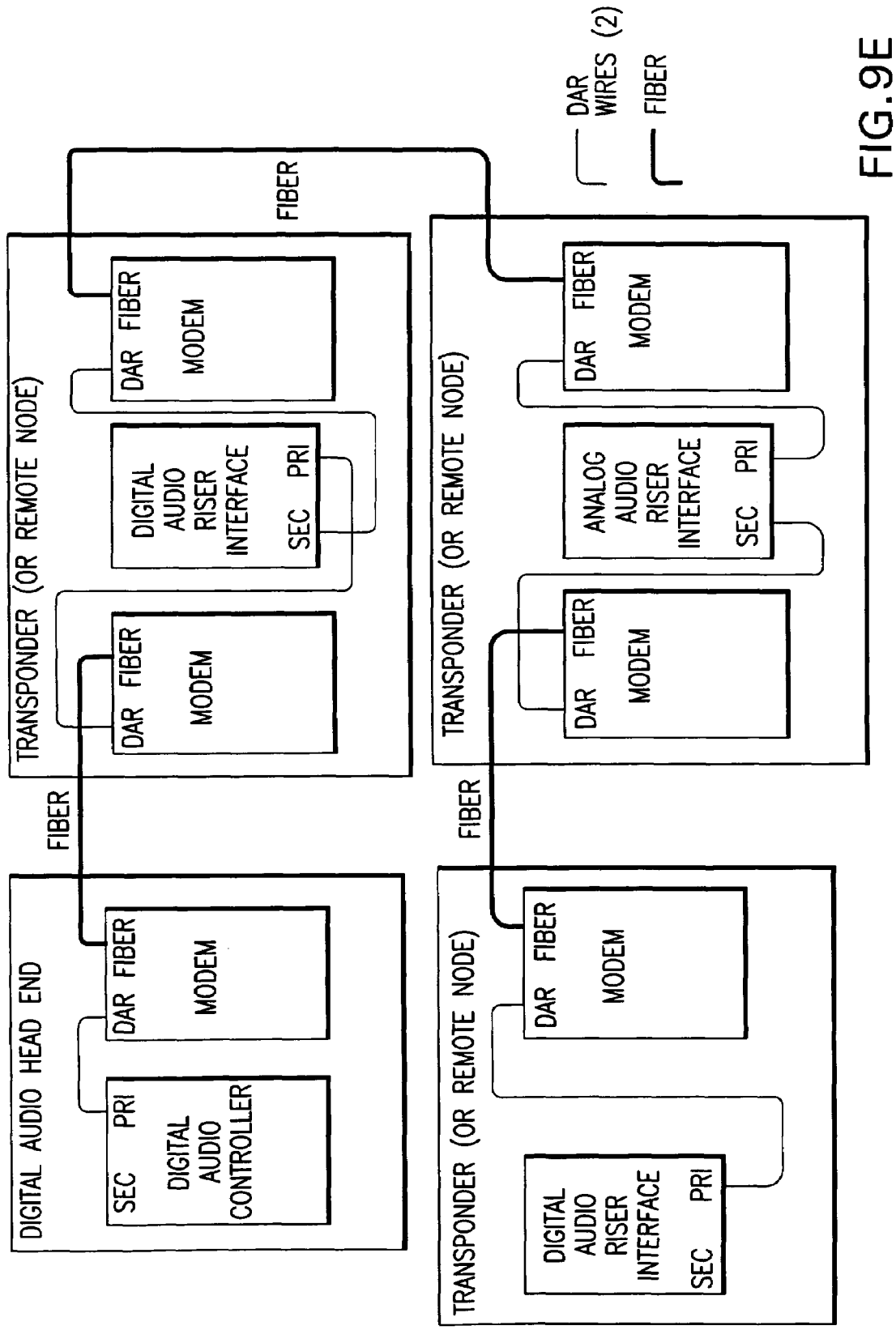
FIG. 9E is a schematic diagram illustrating the configuration of the digital audio interfaces of the system of FIG. 9A.

FIG. 9E is a schematic diagram illustrating the configuration of the digital audio interfaces of the system of FIG. 9A.

Figure 10A:
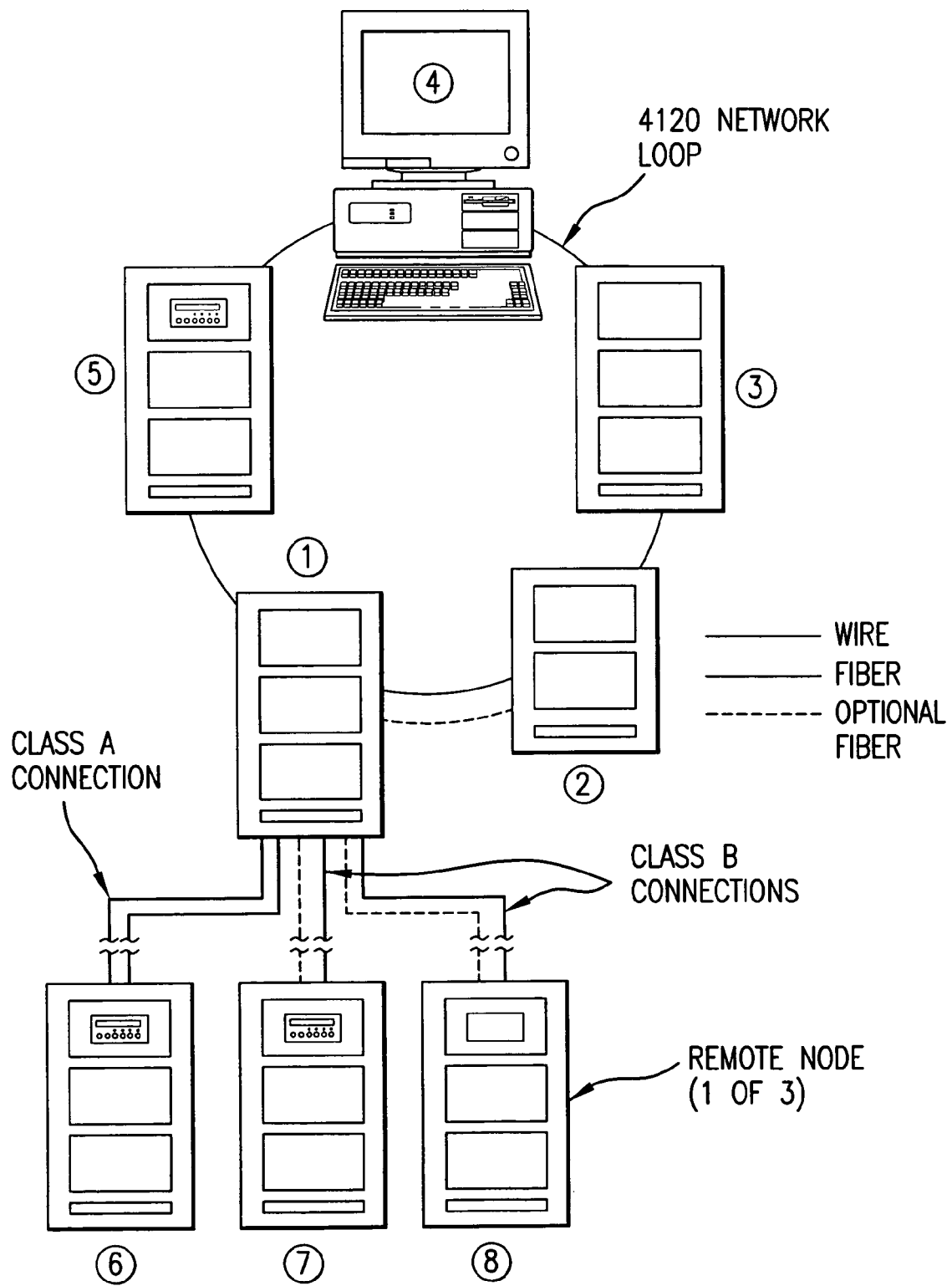
FIG. 10A is a schematic diagram illustrating the use of an embodiment of the present invention within a hub configuration.

FIG. 10A is a schematic diagram illustrating the use of an embodiment of the present invention within a hub configuration. A hub configuration consists of a main loop with nodes connected in a radial manner. In the illustrative configuration shown, modems connect the hub node to the remote nodes. Where T-tapping is not allowed, then the optional fiber shown is needed if an audio interface is used.

Figure 10B:
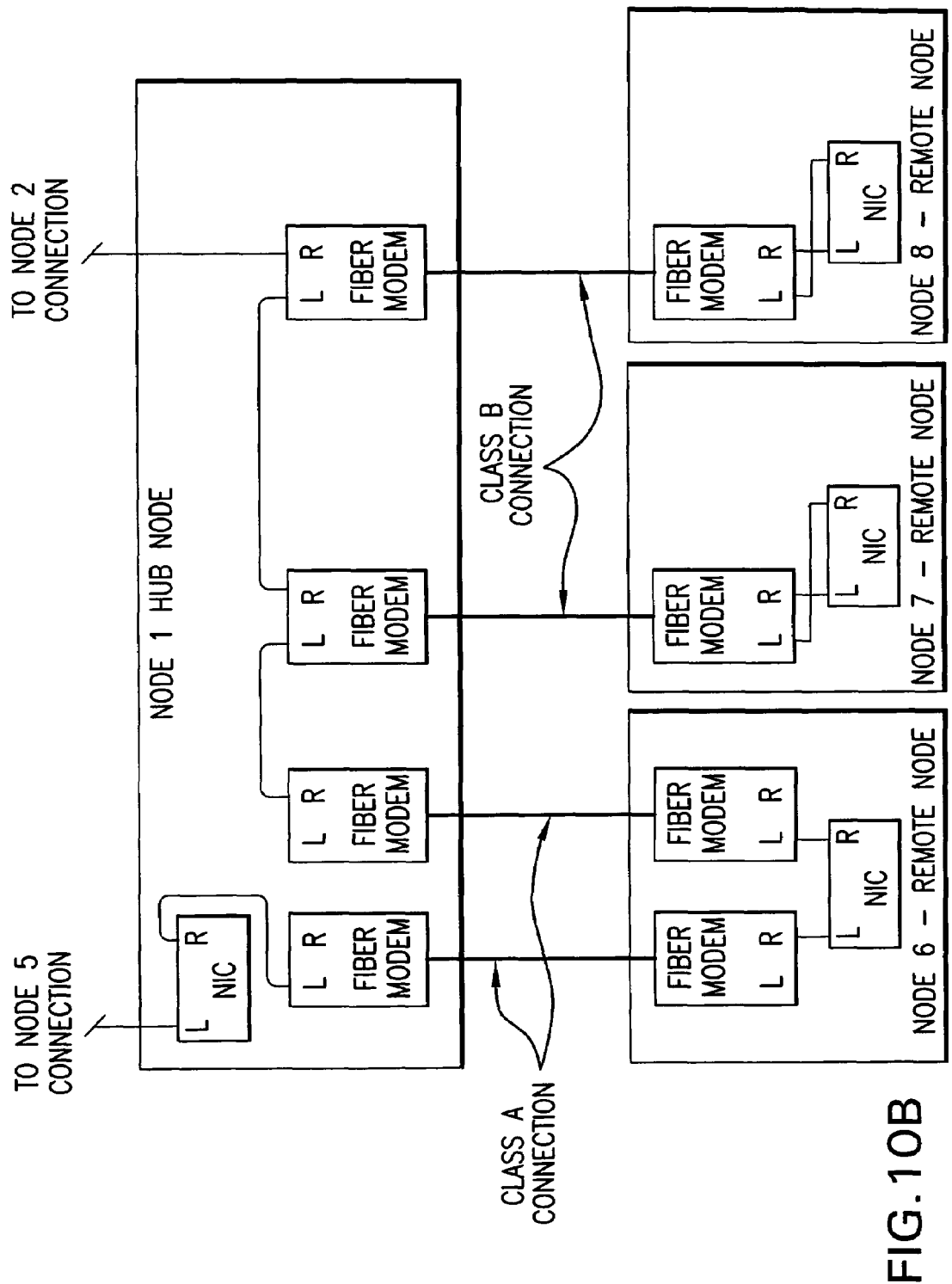
FIG. 10B is a schematic diagram illustrating a possible configuration of the network interfaces of the system of FIG. 10A.

FIG. 10B is a schematic diagram illustrating a possible configuration of the network interfaces of the system of FIG. 10A.

Figure 10C:
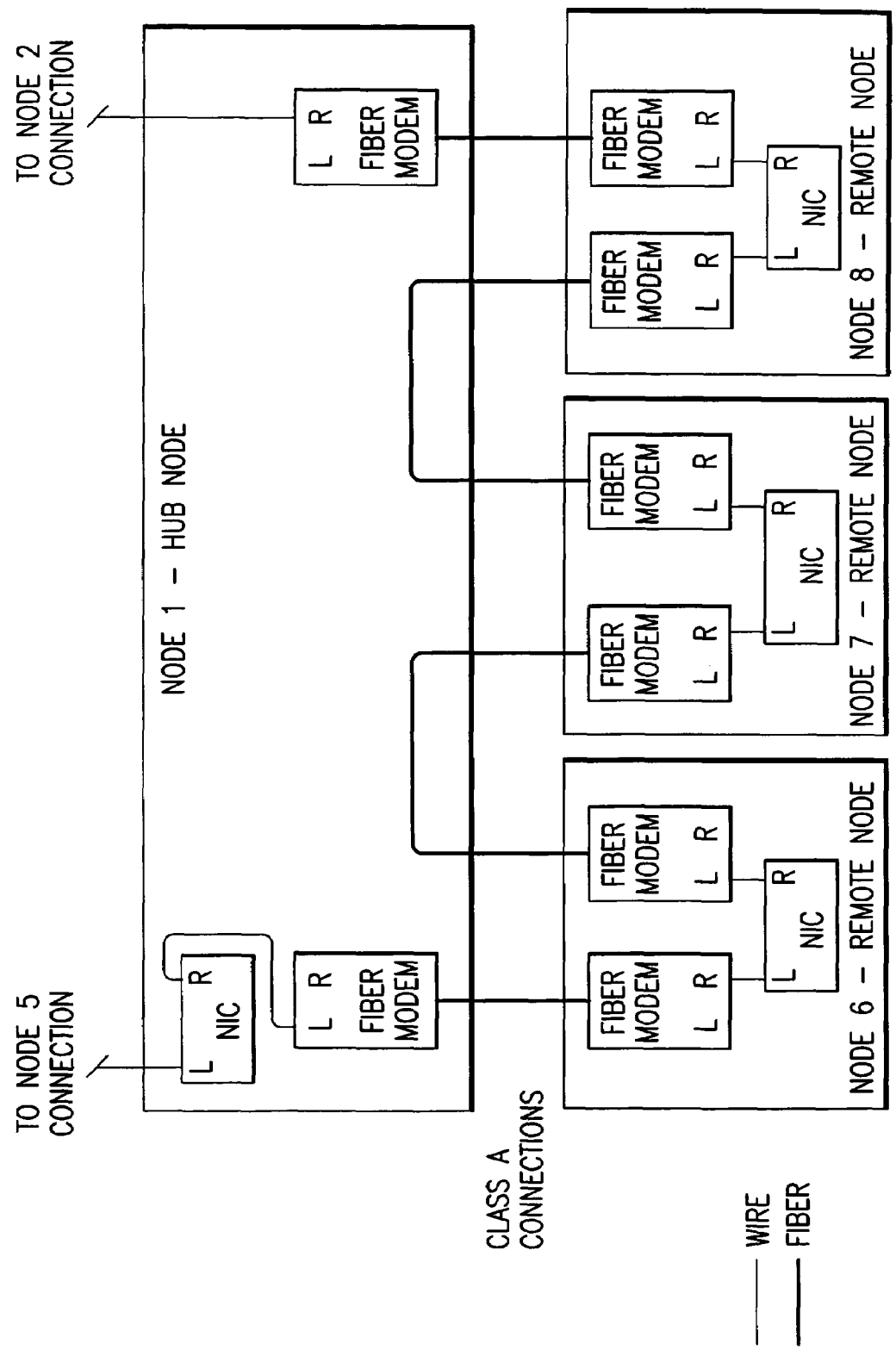
FIG. 10C is a schematic diagram illustrating an alternative configuration of the network interfaces of the system of FIG. 10A.

FIG. 10C is a schematic diagram illustrating an alternative configuration of the network interfaces of the system of FIG. 10A.

Figure 10D:
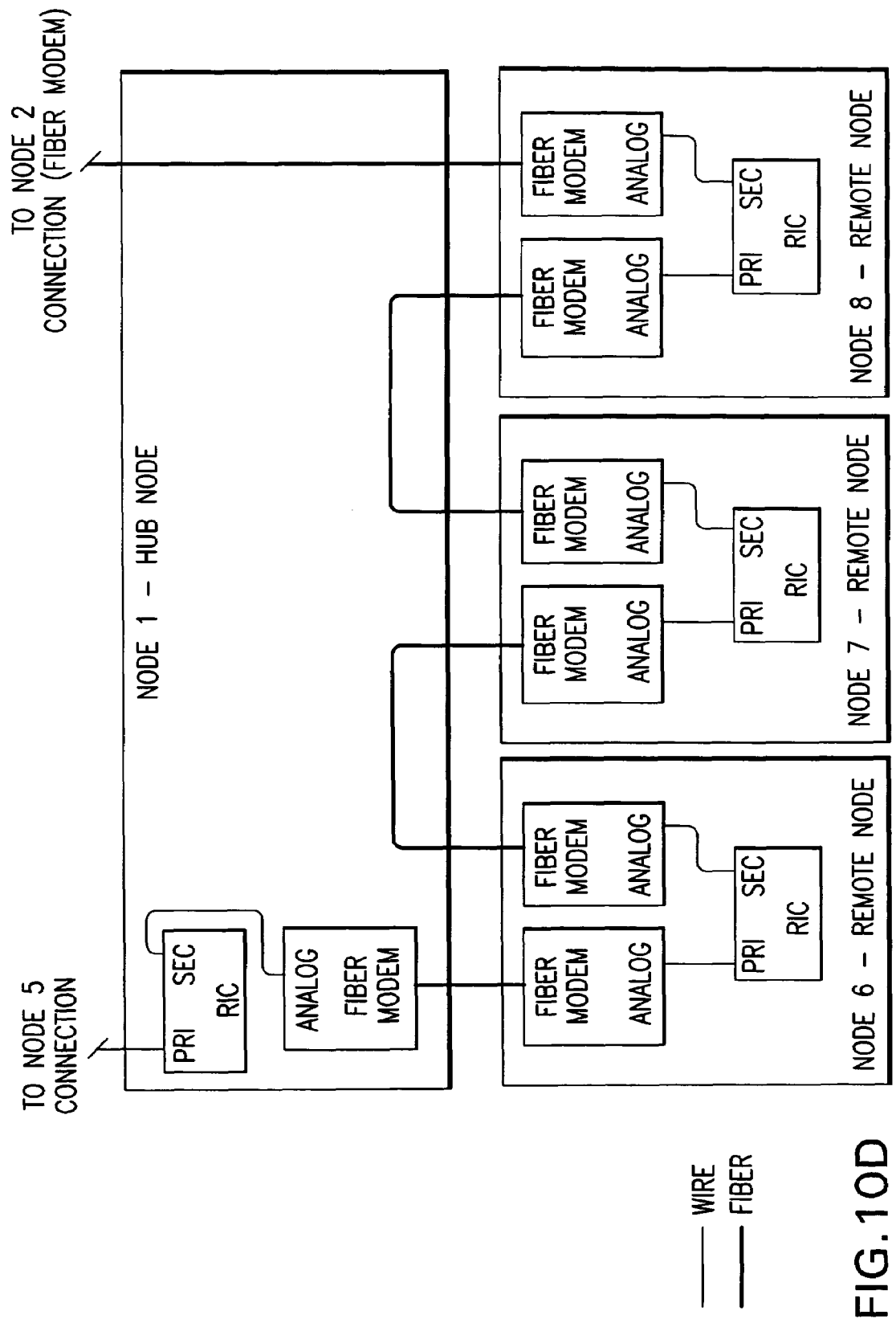
FIG. 10D is a schematic diagram illustrating the configuration of the analog audio interfaces of the system of FIG. 10A.

FIG. 10D is a schematic diagram illustrating the configuration of the analog audio interfaces of the system of FIG. 10A. In this diagram, the head-end audio cabinet is not shown. If Class A is required, head and tail-end modems require x-link connections.

Figure 10E:
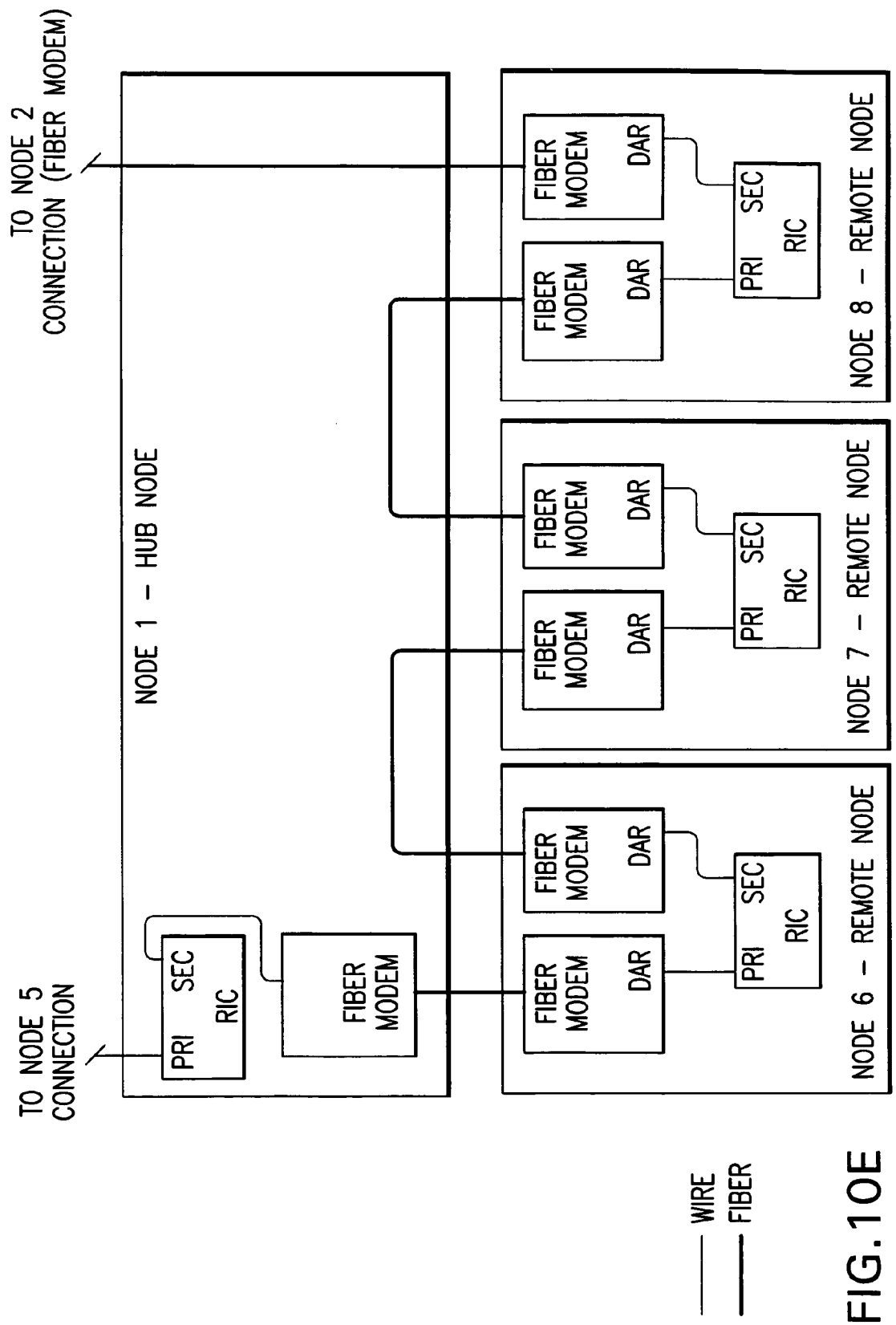
FIG. 10E is a schematic diagram illustrating the digital audio interfaces within the system of FIG. 10A.

FIG. 10E is a schematic diagram illustrating the digital audio interfaces within the system of FIG. 10A.

Figure 11A:
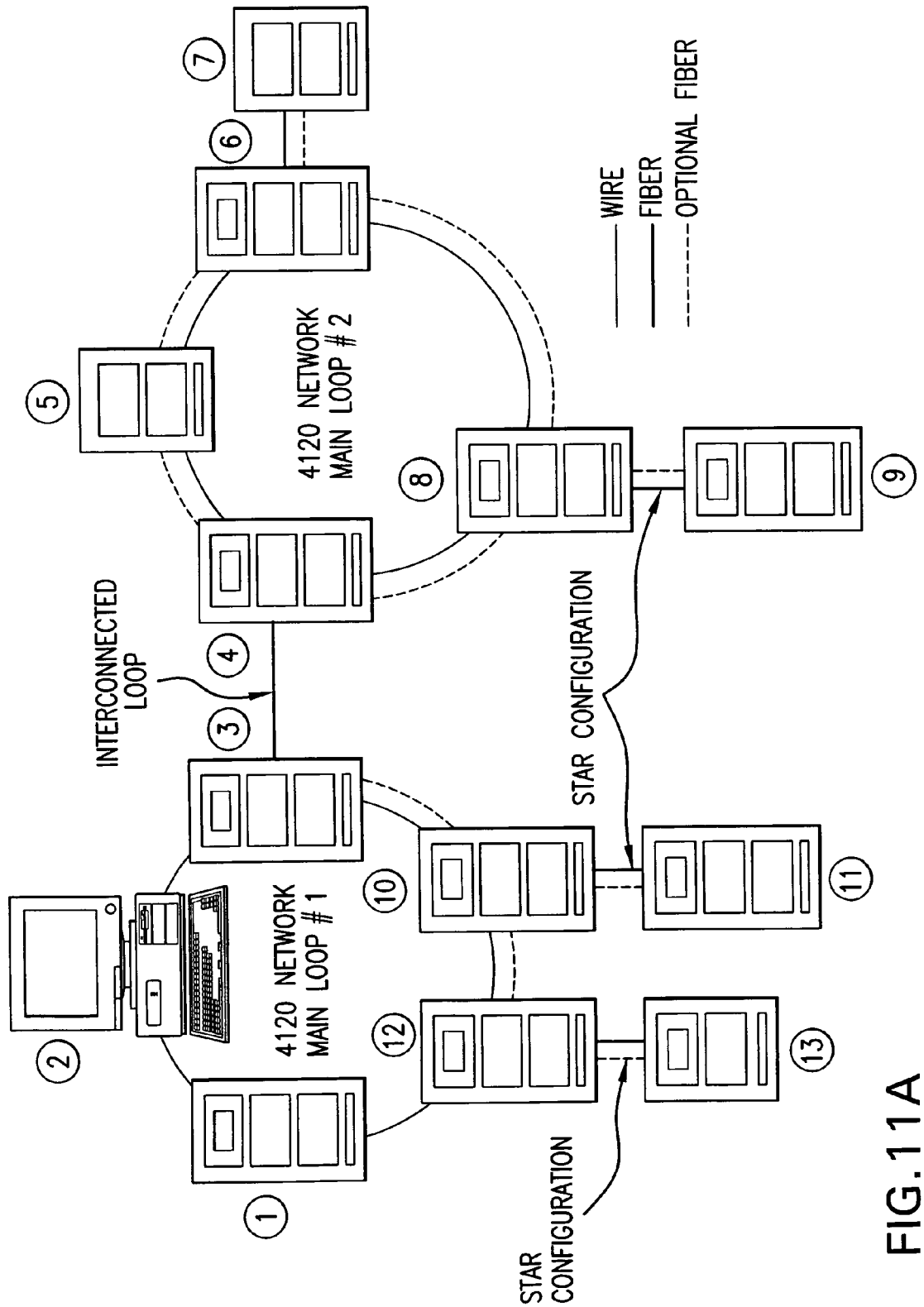
FIG. 11A is a schematic diagram illustrating the use of an embodiment of the present invention within an integrated loop and star configuration.

FIG. 11A is a schematic diagram illustrating the use of an embodiment of the present invention within an interconnected loop and hub configuration. In this configuration, the fiber modem connects the two Class A network loops in tandem. Modems also connect several remote nodes to the loop.

Figure 11B:
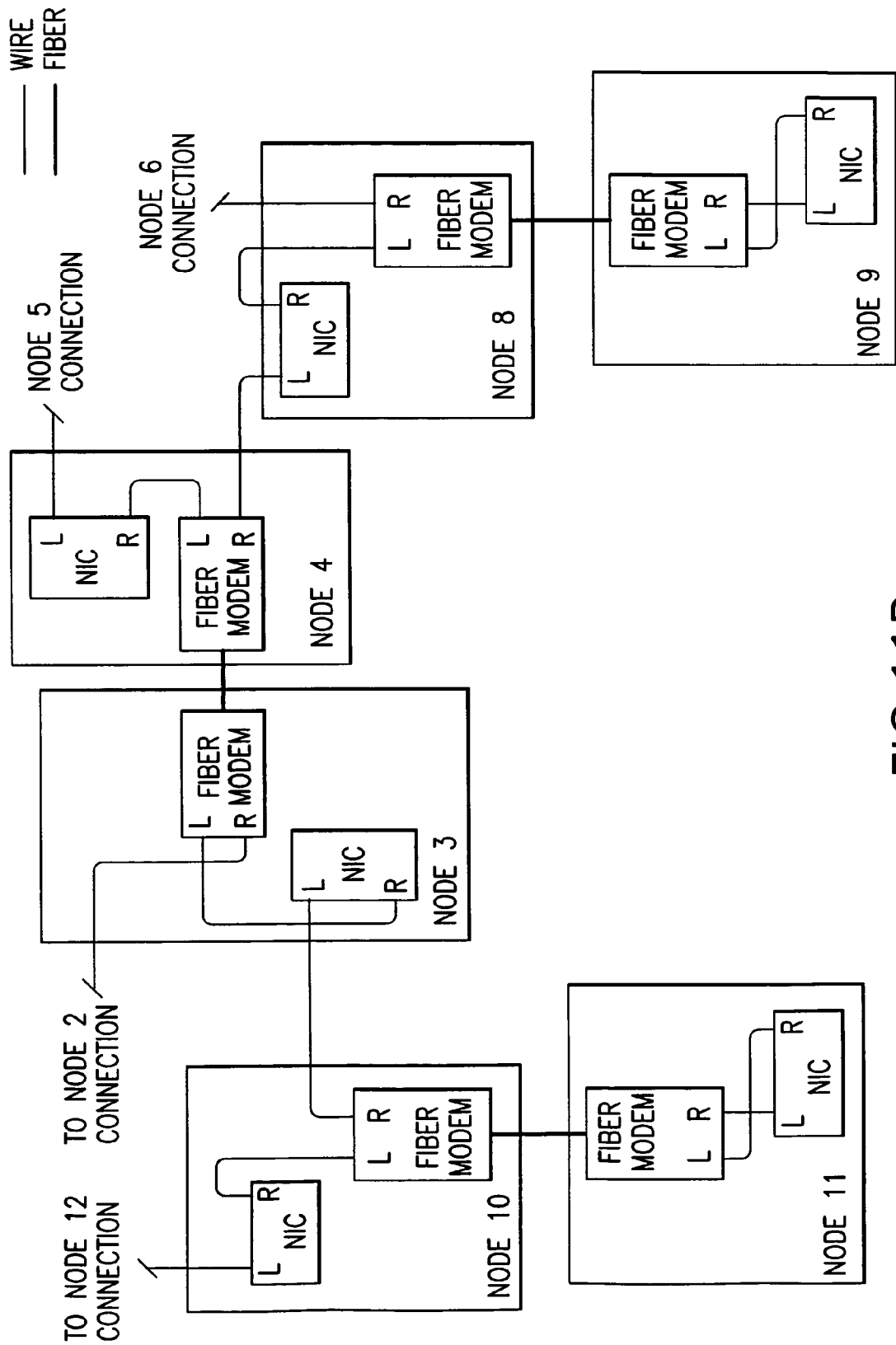
FIG. 11B is a schematic diagram illustrating the configuration of network interfaces of the system of FIG. 11A.

FIG. 11B is a schematic diagram illustrating the configuration of network interfaces of the system of FIG. 11A.

Figure 11C:
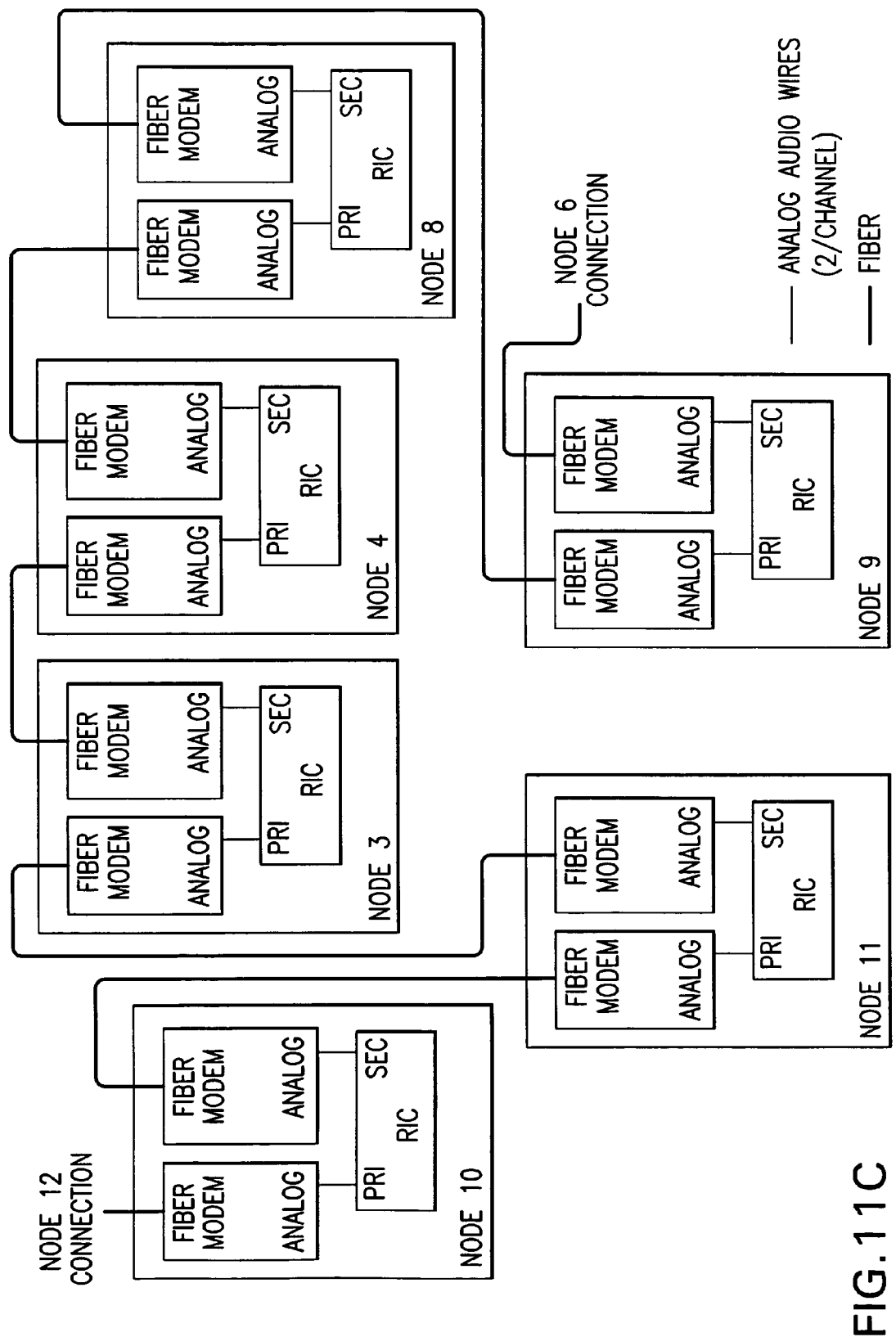
FIG. 11C is a schematic diagram illustrating the analog audio interfaces of the system of FIG. 11A.

FIG. 11C is a schematic diagram illustrating the analog audio interfaces of the system of FIG. 11A.

Figure 11D:
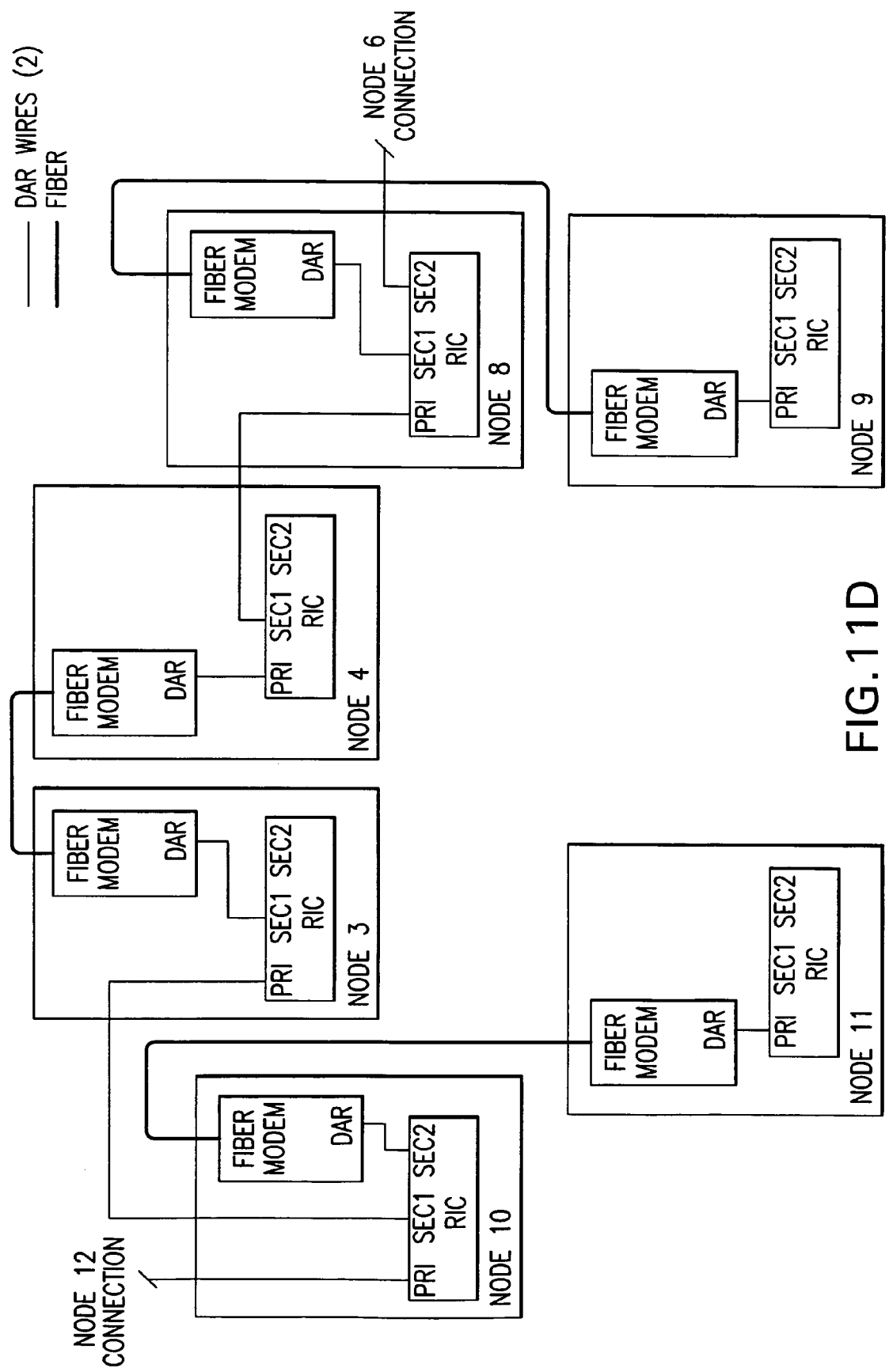
FIG. 11D is a schematic diagram illustrating the digital audio interfaces within the system of FIG. 11A.

FIG. 11D is a schematic diagram illustrating the digital audio interfaces within the system of FIG. 11A.

Analog Channel Routing Control

Figure 12:
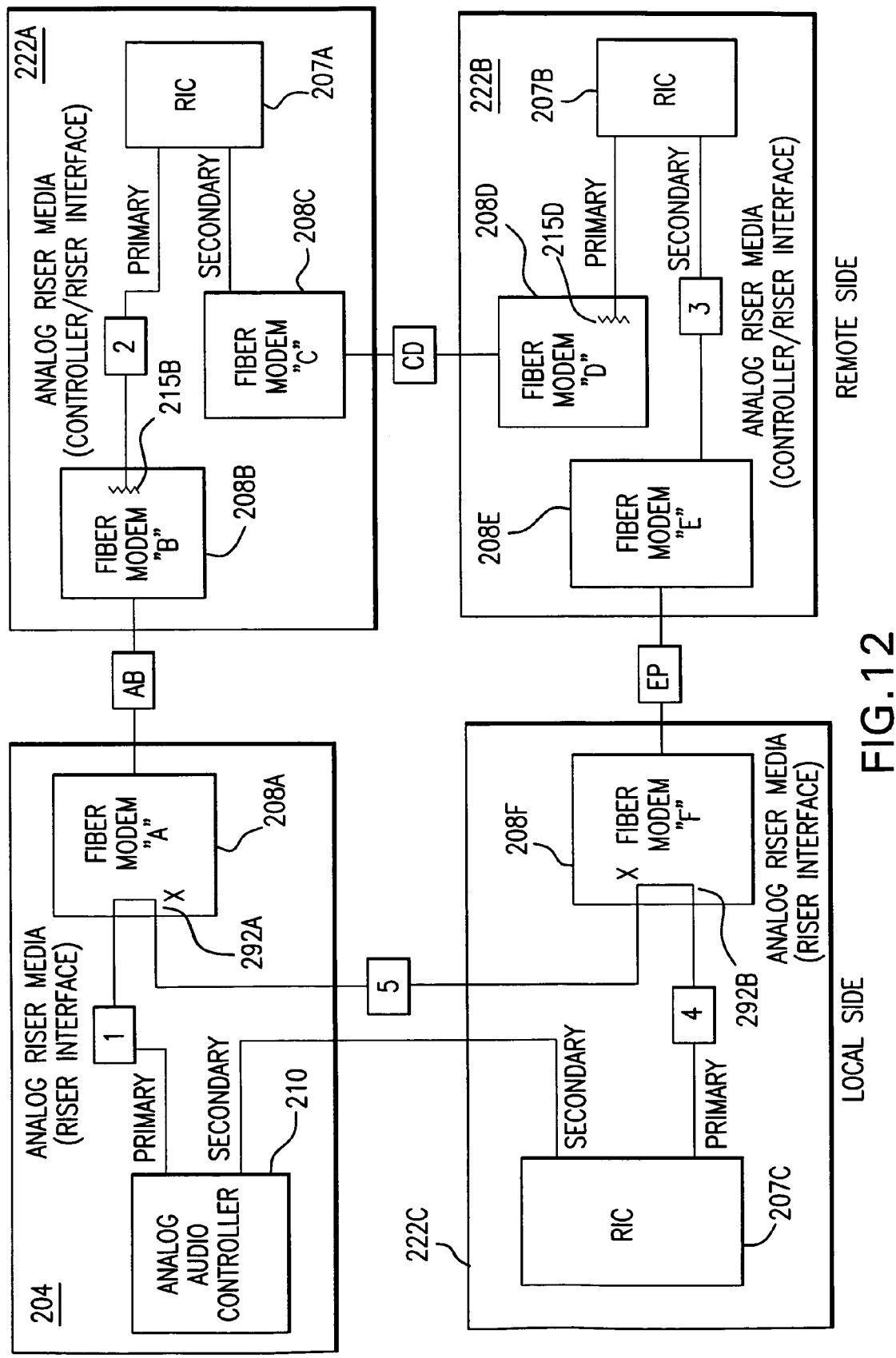
FIG. 12 is a schematic diagram illustrating methods of fault detection, configuration control and recovery in a simple analog audio Class A configuration using present invention fiber modems.
Figure 13:
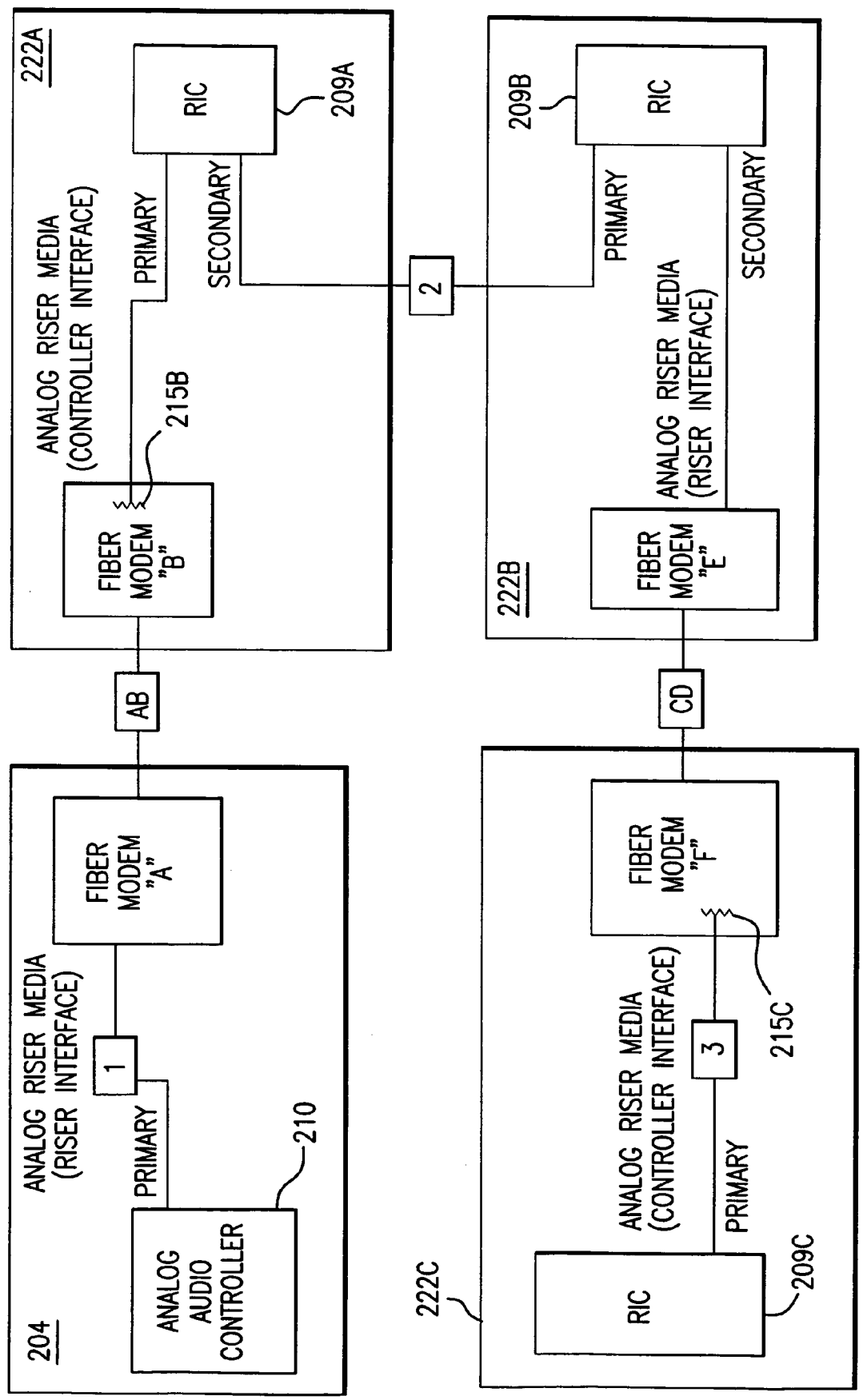
FIG. 13 is a schematic diagram illustrating methods of fault detection, configuration control and recovery in a simple analog audio Class B configuration using present invention fiber modems.
Figure 14:
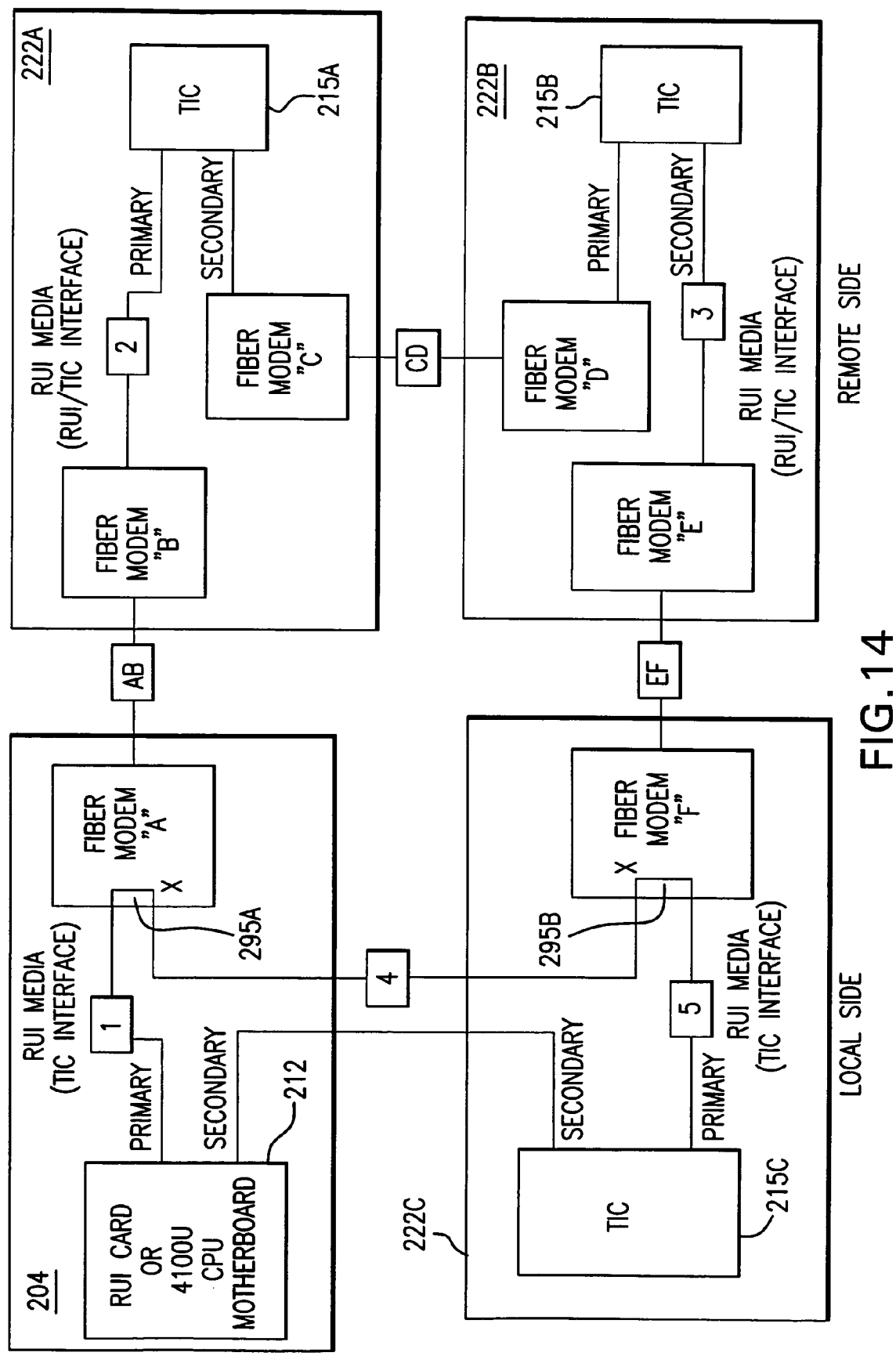
FIG. 14 is a schematic diagram illustrating methods of fault detection, configuration control and recovery in a simple RUI Class A configuration using present invention fiber modems.

FIGS. 12-14 and Tables 4-8 show the methods of fault detection, configuration control, and recovery. Each figure shows a sample configuration, with individual faults indicated by small labeled boxes. The tables show the method of detection of the fault, and the process of entering degraded operation. The tables also show the method of recovery from degraded mode.

FIG. 12 illustrates a simple analog audio Class A configuration with one master control panel 204 and three transponders 222. One of the transponders 222C is on the "local" side of the fiber optic links, although it could be located over 1,000 feet from the control panel 204. The small labeled boxes represent potential optical fiber breaks or faults and correspond with Table 4 as described below.

The master control panel 204 contains an analog audio controller 210 which has primary and secondary ports. In "normal" operation, this controller 210 expects to transmit the audio signal from the primary port and to receive the signal at the secondary port for verification of the circuit. Modem A 208A receives the analog signal, and passes it, through its closed connection x-link 292A to Modem F 208F, while also digitizing the signal and multiplexing it with network data and any control/status data for transmission by fiber to transponder 222A. From the viewpoint of the analog audio controller 210, Modem A 208A looks like a riser interface card (RIC). In fact, Modem A 208A is configured (for example, by setting DIP switches) to default to RIC behavior.

The analog signal passes through Modem F's (208F) closed connection x-link 292B to RIC 207C, which passes the analog signal through an analog audio riser (not shown) and finally back to the secondary port of the analog audio controller 210.

Within transponder 222A, Modem B (208B), receives and demultiplexes the multiplexed signal, extracting the analog audio signal and forwarding it to the primary port of RIC 207A. Modem B 208B is configured to default to appear to RIC 207A as an analog audio controller (AAC). In this AAC mode, Modem B 208B presents an end-of-line (EOL) resistor 215B or equivalent to RIC 207A.

RIC 207A passes the audio analog signal out through its secondary port to Modem C 208C, which multiplexes the signal with communications signals and transmits the multiplexed data stream to Modem D 208D over fiber CD. Modem C 208C is configured to default to "RIC" mode.

Transponder 222B has components 208D, 208E, 207B that parallel those of transponder 222A. Transponder 222C, on the local side of the fiber optic links, that is, connected electrically with the control panel 204, has the "tail end" modem, Modem F (208F) and a RIC 207C.

Table 4 below, shows how the fiber multiplex modems 208 of FIG. 12 react when a fault, i.e., a short or open circuit, is detected at each of the identified boxes. In Table 4, action begins with the left-most entry in a row, designated with an asterisk "*". For each modem, the triggering event is identified first, then (separated from the event by a colon ":") the action taken by the modem.

For example, if a fault occurs at Box 2, corresponding to Fault 2 in Table 4, Modem C 208C cannot sense Modem B's end-of-line (EOL) resistor 215B. Modem C, which defaults to RIC mode, then switches AAC mode, and sends a flag to its mate, Modem D. Modem D receives this flag (the trigger) and opens its EOL resistor (the action). Modem E, upon detecting the loss of the EOL resistor 215B, switches to AAC mode and sends a flag to its mate, Modem F. Modem F, upon receiving the flag, opens the x-link switch 292B. The analog audio controller 210 detects the open circuit created by the opening of switch 292B and takes corrective action.

The remaining rows of Table 4 are to be interpreted similarly for the different breaks or faults as indicated by the small corresponding boxes of FIG. 12.

TABLE 4

Class A analog audio fault detection and recovery

| | Configuration | | | | | |
|---|---|---|---|---|---|---|
| Fault | Modem A head end RIC | Modem B generic AAC | Modem C generic RIC | Modem D generic AAC | Modem E generic RIC | Modem F tail end RIC |
| 1 | No detection or recover; controller handles faults. | | | | | |
| 2 | | | *no EOL: mode AAC & set flag | flag: mode RIC & open EOL | no EOL: mode AAC & set flag | flag: open xlink |
| 2 restore | | | *EOL: mode RIC & clear flag | flag: mode AAC & close EOL | EOL: mode RIC & clear flag | flag: close xlink |
| 3 | | | | | *no EOL: mode AAC & set flag | flag: open xlink |
| 3 restore | | | | | *EOL: mode RIC & clear flag | flag: close xlink |
| 4 | No detection or recover; controller handles faults. | | | | | |
| 5 | No detection or recover; controller handles faults. | | | | | |
| AB | | *no fiber: open EOL | no EOL: mode AAC & set flag | flag: mode RIC & open EOL | no EOL: mode AAC & set flag | flag: open xlink |
| AB restore | | *fiber: close EOL | EOL: mode RIC & clear flag | flag: mode AAC & close EOL | EOL: mode RIC & clear flag | flag: close xlink |
| CD | | | no fiber: | *no fiber: | no EOL: | flag: |

TABLE 4-continued

Class A analog audio fault detection and recovery

Configuration

| Fault | Modem A head end RIC | Modem B generic AAC | Modem C generic RIC | Modem D generic AAC | Modem E generic RIC | Modem F tail end RIC |
|---|---|---|---|---|---|---|
| | | | no action | open EOL | mode AAC & set flag | open xlink |
| CD restore | | | fiber: no action | *fiber: close EOL | EOL: mode RIC & clear flag | flag: close xlink |
| EF | | | | | no fiber: no action | *no fiber: open xlink |
| EF restore | | | | | fiber: no action | *fiber: close xlink |

FIG. 13 illustrates a simple analog audio Class B configuration with one master control panel 204 and three transponders 222. The components are similar to those shown in FIG. 12 and corresponding reference numbers are used where possible. Note that unlike the system of FIG. 12, the system of FIG. 13 has no return link from transponder 222C back to the alarm control panel 204, and thus there is no x-link between fiber modems A and F.

Table 5 below provides fault detection and recovery data for FIG. 13. Although Table 5 is similar to Table 4, rows should be read from right to left. That is, actions begin with the right-most entry in a row (designated with an asterisk "*") and propagate to the left.

TABLE 5

Class B analog audio fault detection and recovery

Configuration

| Fault | Modem A head end RIC | Modem B generic AAC | Modem E generic RIC | Modem F generic AAC |
|---|---|---|---|---|
| 1 | No detection or recover; controller handles faults. | | | |
| 2 | flag: open EOL | *no EOL: set flag | | |
| 2 restore | flag: close EOL | *EOL: clear flag | | |
| 3 | flag: open EOL | no EOL: set flag | flag: open EOL | *no EOL: set flag |
| 3 restore | flag: close EOL | EOL: clear flag | flag: close EOL | *EOL: clear flag |
| AB | *no fiber: open EOL | no fiber: no action | | |
| AB restore | *fiber: close EOL | fiber: no action | | |
| EF | flag: open EOL | no EOL: set flag | *no fiber: open FOL | no fiber: no action |
| EF restore | flag: close EOL | EOL: clear flag | *fiber: close EOL | no fiber: no action |

Table 6 below lists the conditions that are implemented in the FPGA logic to accomplish the responses that are shown in the two analog configuration tables, i.e., Tables 4 and 5, above. The analog flag remains in its fault state until a fault clears. Modems do not latch the state of the flag or their mode.

TABLE 6

Analog control output functional summary

| Mode 1 = controller | If default = AAC, follow flag for mode switch. If default = RIC, follow EOL detect for mode switch. |
|---|---|

TABLE 6-continued

Analog control output functional summary

| | |
|---|---|
| | Lock RIC if not generic or fiber fault. |
| | Lock in default if class B. |
| | Any reset restores to default. |
| X-link control 1 = open | Open if flag or fiber fault. |
| | Lock closed if not tail end or class B. |
| | Any reset restores to default. |
| Analog flag 1 = fault | If default = AAC & class B, flag if no EOL. |
| | Lock if default - AAC and class A. |
| | If default = RIC & class A, flag if no EOL. |
| | Lock if default = RIC and class B. |
| Class A LED 0 = on | On if mode is not equal to default. |
| | On if class B & no EOL or flag. |
| | On if fiber fault. |
| EOLR/DC 1 = DC | If default = AAC & class A, open if flag or fiber fault. |
| | Lock off if default = AAC and class B. |
| | If default = RIC and class B, open if flag or fiber fault. |
| | If default = RIC and class A, lock no EOL. |
| | Any reset restores to default. |

FIG. 14, along with Tables 7 and 8 below, illustrates the methods of fault detection, configuration control and recovery used for RUI routing control. FIG. 14 shows a simple configuration, similar to that of FIG. 12 and using corresponding reference numbers where possible, with individual faults indicated by the small numbered or lettered boxes. Tables 7 and 8 show the method of detection of the fault and the process of entering degraded operation. These tables also show the method of recovery from degraded mode. Note that the term "14 s flag" refers to the tail end modem flagging its mate every 14 seconds while in degraded mode to test for restoration of the fault. If the fault is still present when the flag is received, the modem returns to normal mode, and then immediately falls back into degraded mode.

The master control panel 204 includes an RUI card or similar controller 212. Each of the transponders has a transponder interface card (TIC) 215.

The rows of Table 7 corresponding to faults detected at 2, 3, AB, CD and EF are to be read from left to right, while the corresponding restore operations are to be read from right to left. First actions are marked with an asterisk "*".

TABLE 7

Class A RUI fault detection and recovery

| | Configuration | | | | | |
|---|---|---|---|---|---|---|
| Fault | Modem A head end TIC | Modem B generic RUI | Modem C generic TIC | Modem D generic RUI | Modem E generic TIC | Modem F tail end TIC |
| 1 | Class A circuits isolate fault; no modem mode changes. | | | | | |
| 2 | | | *no DC: mode RUI & flag | flag: mode TIC | no DC: mode RUI & flag | flag: open xlink |
| 2 restore | | | flag: mode TIC | no DC: mode RUI & flag | flag: mode TIC | *14s flag: close xlink & flag |
| 3 | | | | | *no DC: mode RUI & flag | flag: open xlink |
| 3 restore | | | | | flag: mode TIC | *14s flag: close xlink & flag |
| 4 | Class A circuits isolate fault; no modem mode changes | | | | | |
| 5 | Class A circuits isolate fault; no modem mode changes | | | | | |
| AB | no fiber: no change | *no fiber: mode TIC | no DC: mode RUI & flag | flag: mode TIC | no DC: mode RUI & flag | flag: open xlink |
| AB restore | fiber: no change | no DC: mode RUI | flag: mode TIC | no DC: mode RUI & flag | flag: mode TIC | *14s flag: close xlink & flag |
| CD | | | no fiber: no action | *no fiber: mode TIC | no DC: mode RUI & flag | flag: open xlink |
| CD restore | | | no fiber: no change | no DC: mode RUI & flag | flag: mode TIC | *14s flag: close xlink & flag |
| EF | | | | | no fiber: no change | *no fiber: open xlink |
| EF restore | | | | | fiber: no change | fiber: close xlink |

Note that for class B operation, no mode changes are performed. All modems remain in their respective default modes.

It should be understood that although the components of FIGS. 12 and 14, such as an analog audio controller 210 (FIG. 12) and an RUI card 215C (FIG. 14) may both be present simultaneously, they are not shown together for simplicity.

Table 8 below lists the conditions that are implemented in the FPGA logic to accomplish the responses that are shown in Table 7. The RUI flag read may be triggered, for example, on a rising edge. Modems latch their state. The 14 s timer is a 14-second timer that runs continuously in the tail-end modem. The tail-end modem closes its x-link and flags its mate every time the timer rolls over, i.e., every 14 seconds, to recover from degraded mode. (If the x-link is already closed, then it remains closed.) If the mating modem is already in normal mode, then nothing happens.

TABLE 8

RUI control output functional summary

| Mode 1 = RUI | If default = RUI: switch if fiber fault or flag/recover if no DC. If default = TIC: switch if no DC/recover per flag. Lock TIC if RUI disabled or not generic. Lock default if class B. Any reset restores to default. |
|---|---|
| X-link control 1 = open | Open if flag or fiber fault/recover when 14s flag timer occurs. Lock if RUI disabled or class B or not tail end. Any reset restores to default. |
| RUI flag 1 = statchg | If current mode = TIC: flag if no DC. Flag if tail and 14s timer occurs. |

TABLE 8-continued

RUI control output functional summary

| Class A LED 0 = on | On if current mode is not equal to default mode OR x-link open. Lock off if RUI disabled or Class B. On if fiber fault. |
|---|---|

Further Embodiments

Figure 15:
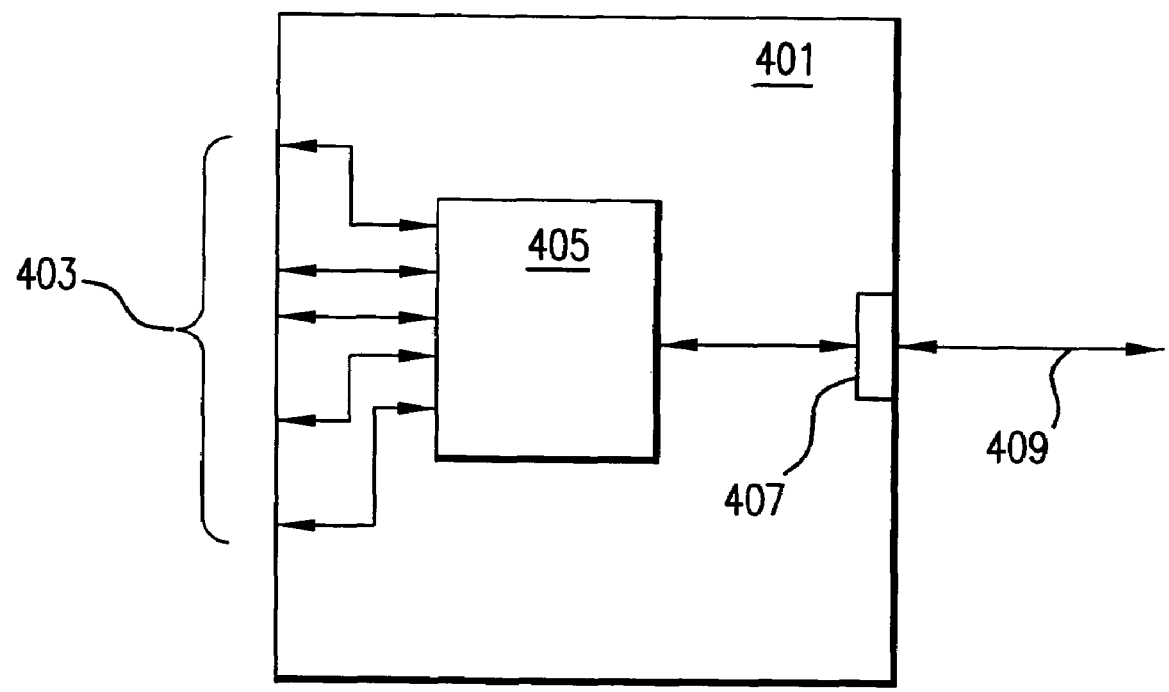
FIG. 15 is a simplified schematic that covers several different embodiments of the present invention fire alarm network fiber optic multiplex modem.

FIG. 15 is a simplified schematic that covers several different embodiments of a fire alarm network fiber optic multiplex modem 401. The modem 401 comprises several local interfaces 403 including, but not limited to, at least one of: a peer-to-peer protocol control panel communications interface; a master-to-slave protocol control panel/transponder communications interface; a digital audio interface; an analog audio interface; and a fire fighter phone interface. Although five local interfaces 403 are shown, it would be understood by one skilled in the art that any number of local interfaces may be present in a particular implementation.

A combiner/decombiner 405 combines data received at the local interfaces into an outgoing optical combined signal. The combiner/decombiner 405 also separates an incoming optical combined signal into its constituent data streams and forwards each of the separate data streams to a corresponding local interface. The outgoing optical combined signal is transmitted, and the incoming optical combined signal is received, over a single optical fiber 409 through a fiber optic interface 407. In particular, the combiner/decombiner 405 can use, among other techniques, dense-wavelength-division-multiplexing and/or time-division multiplexing, as described below.

Dense-Wavelength-Division-Multiplexing

An alternative embodiment of the invention uses dense-wavelength-division-multiplexing (DWDM) to multiplex the local inputs in the optical domain rather than in the time domain. The received data at each local input forms a distinct output stream, and a different wavelength is dedicated for each output stream. The various output streams are then transmitted concurrently over the fiber, each with its own dedicated wavelength channel. In addition, the modem concurrently receives over the fiber multiple input streams, each at unique wavelength. A DWDM implementation would greatly reduce the logic required, but would significantly increase the cost of the optical components.

Alternatively, data from one or more subsets of the local inputs can be combined or multiplexed into distinct input streams using fiber frames similar to that described previously. Each of these distinct input streams may be assigned a unique wavelength for transmission on the fiber. Incoming data from the fiber may be treated similarly. For example, digital audio and fire fighter phone audio can be combined into a single output stream and transmitted at one wavelength, while network communications data forms a second output stream, transmitted at a different wavelength.

Time Division Multiplexing

In yet another embodiment of the present invention, time division multiplexing (TDM), already used as discussed previously to multiplex local inputs into the optical stream, is also used to multiplex the two data directions (outgoing and incoming) on the optical interface in lieu of wavelength division multiplexing (WDM). In such an implementation, one modem may be designated as the master, and one as the slave. The master controls the communications channel, while the slave follows the master. The input data may be compressed to a format similar to that previously described, although further compression in the time domain may be necessary so that a frame can be transmitted in half (at most) of the normal duration, since the other half of the normal duration is required for the slave to transmit its frame. The master transmits its data to the slave. The slave may immediately follow by transmitting its own data back to the master. In such an implementation, a single wavelength can be used for both directions. While this could complicate the logical implementation, it may significantly reduce the cost of the optical components.

While this invention has been particularly shown and described with references to preferred embodiments thereof, it will be understood by those skilled in the art that various changes in form and details may be made therein without departing from the scope of the invention encompassed by the appended claims.

What is claimed is:

1. A fire alarm network fiber optic multiplex modem, comprising:
   plural local interfaces, a first interface of the plural local interfaces adapted to interface with data of a first data type and a second interface of the plural local interfaces adapted to interface with data of a second data type, the first data type being different from the second data type, wherein at least one of the first or second interfaces receives a signal that is unsynchronized with the fiber optic multiplex modem and wherein the signal is sampled at plural intervals within a frame cycle;
   a fiber optic interface;
   a multiplexor which combines data received at the local interfaces into an outgoing data stream, wherein a digital value is placed in the outgoing data stream based on at least one of said samples;
   a fiber optic modem which transmits, at a first wavelength, the outgoing data stream to the fiber optic interface and which receives, at a second wavelength, an incoming data stream via the fiber optic interface; and
   a demultiplexor which separates the incoming data stream into separate data streams, and which forwards each of said separate data streams to a corresponding local interface,
   wherein the at least one of the first or second interfaces is a digital audio interface which receives a digital audio signal that is not synchronized with the fiber optic multiplex modem,
   wherein the received digital audio signal is sampled at the plural intervals within the frame cycle, the digital audio value being placed in the outgoing data stream based on said samples, and
   wherein the digital audio value corresponds to the first sample taken during the frame cycle, a second value being placed in the outgoing data stream, said second value indicating in which of the plural samples the received digital audio signal changed values.

2. The fiber optic multiplex modem of claim 1, a third value being placed in the outgoing data stream, said third value indicating whether there has been a change in the received digital audio signal.

3. A fire alarm network fiber optic multiplex modem, comprising:
   plural local interfaces, a first interface of the plural local interfaces adapted to interface with data of a first data type and a second interface of the plural local interfaces adapted to interface with data of a second data type, the first data type being different from the second data type, wherein at least one of the first or second interfaces receives a signal that is unsynchronized with the fiber optic multiplex modem and wherein the signal is sampled at plural intervals within a frame cycle;
   a fiber optic interface;
   a multiplexor which combines data received at the local interfaces into an outgoing data stream, wherein a digital value is placed in the outgoing data stream based on at least one of said samples;
   a fiber optic modem which transmits, at a first wavelength, the outgoing data stream to the fiber optic interface and which receives, at a second wavelength, an incoming data stream via the fiber optic interface;
   a demultiplexor which separates the incoming data stream into separate data streams, and which forwards each of said separate data streams to a corresponding local interface;
   a cross-link to a second fiber optic multiplex modem, the cross-link normally completing a communications loop; and
   a fault detector which, upon detection of a fault in a communications path that extends from the fiber optic interface, disconnects the cross-link.

4. The fiber optic multiplex modem of claim 3, the fault detector detecting the fault via information embedded in an incoming data stream received over an optical fiber from a third fiber optic multiplex modem which has detected the fault.

5. The fiber optic multiplex modem of claim 3, the fault detector detecting the fault responsive to a failure to receive a valid incoming data stream via said communications path.

6. The fiber optic multiplex modem of claim 3, the fault detector detecting the fault responsive to a failure to detect electrical continuity.

7. The fiber optic multiplex modem of claim 3, wherein if the detected fault is a short circuit, the fault detector causes a short circuit across the communications loop.

8. A method for communicating between nodes in a fire alarm network, the method comprising:
   multiplexing data received from plural local interfaces into an outgoing data stream, a first interface of the plural local interfaces adapted to interface with data of a first data type and a second interface of the plural local interfaces adapted to interface with data of a second data type, the first data type being different from the second data type, wherein at least one of the first or second interfaces receives a signal that is unsynchronized with the fiber optic multiplex modem, wherein the signal is sampled at plural intervals within a frame cycle, wherein a digital value is placed in the outgoing data stream based on at least one of said samples, wherein the at least one of the first or second interfaces is a digital audio interface which receives an asynchronous digital audio signal;
   transmitting, at a first wavelength, the outgoing data stream to a fiber optic interface;
   receiving, at a second wavelength, an incoming data stream via the fiber optic interface;
   demultiplexing the incoming data stream into separate data streams;
   sampling, at the plural intervals within the frame cycle, the received digital audio signal;
   placing a digital audio value in the outgoing data stream based on said samples, wherein the digital audio value corresponds to the first sample taken during the frame cycle;
   placing a second value in the outgoing data stream, said second value indicating in which of the plural samples the received digital audio signal changed values; and
   forwarding each of said separate data streams to a corresponding local interface.

9. The method of claim 8, further comprising:
   placing a third value in the outgoing data stream, said third value indicating whether there has been a change in the received digital audio signal.

10. A method for communicating between nodes in a fire alarm network, the method comprising:
    multiplexing data received from plural local interfaces into an outgoing data stream, a first interface of the plural local interfaces adapted to interface with data of a first data type and a second interface of the plural local interfaces adapted to interface with data of a second data type, the first data type being different from the second data type;
    transmitting, at a first wavelength, the outgoing data stream to a fiber optic interface;
    receiving, at a second wavelength, an incoming data stream via the fiber optic interface;
    demultiplexing the incoming data stream into separate data streams;
    forwarding each of said separate data streams to a corresponding local interface;
    electrically completing a communications loop prior to transmission on the optic fiber;
    detecting a fault in a communications path that extends from the fiber optic interface; and
    upon said detecting, electrically breaking the communications loop.

11. The method of claim 10, the step of detecting a fault being responsive to information embedded in an incoming data stream received over the optical fiber.

12. The method of claim 10, the step of detecting a fault being responsive to a failure to receive a valid incoming data stream via said communications path.

13. The method of claim 10, the step of detecting a fault being responsive to a failure to detect electrical continuity.

14. The method of claim 10, further comprising:
    if the detected fault is a short circuit, causing a short circuit across the communications loop.

15. A method for communicating between nodes in a fire alarm network, the method comprising:
    multiplexing data received from plural local interfaces into an outgoing data stream, a first interface of the plural local interfaces adapted to interface with data of a first data type and a second interface of the plural local interfaces adapted to interface with data of a second data type, the first data type being different from the second data type, wherein at least one of the first or second interfaces receives a signal that is unsynchronized with the fiber optic multiplex modem, wherein the signal is sampled at plural intervals within a frame cycle, and wherein a digital value is placed in the outgoing data stream based on at least one of said samples, wherein at least one of the local interfaces is an analog interface and wherein at least another of the local interfaces is a digital audio interface;
    transmitting, at a first wavelength, the outgoing data stream to a fiber optic interface;
    receiving, at a second wavelength, an incoming data stream via the fiber optic interface;
    demultiplexing the incoming data stream into separate data streams; and
    forwarding each of said separate data streams to a corresponding local interface
    transmitting the digital value over said digital audio interface for re-multiplexing and re-transmission via a second fiber optic interface.

* * * * *

UNITED STATES PATENT AND TRADEMARK OFFICE
CERTIFICATE OF CORRECTION

PATENT NO. : 7,570,672 B2 Page 1 of 1
APPLICATION NO. : 10/770249
DATED : August 4, 2009
INVENTOR(S) : Farley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1569 days.

Signed and Sealed this

Seventh Day of September, 2010

David J. Kappos
*Director of the United States Patent and Trademark Office*